(12) United States Patent
Ohnishi et al.

(10) Patent No.: US 10,569,531 B2
(45) Date of Patent: Feb. 25, 2020

(54) TRANSFER TYPE INK JET RECORDING METHOD WITH COOLED TRANSFER BODY

(71) Applicant: CANON KABUSHIKI KAISHA, Tokyo (JP)

(72) Inventors: Toru Ohnishi, Yokohama (JP); Takuto Moriguchi, Kamakura (JP); Ryosuke Hirokawa, Kawasaki (JP); Toru Yamane, Yokohama (JP); Noribumi Koitabashi, Yokohama (JP); Noboru Toyama, Kawasaki (JP); Kyosuke Deguchi, Yokohama (JP); Akihiro Mouri, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/022,189

(22) Filed: Jun. 28, 2018

(65) Prior Publication Data
US 2018/0304617 A1 Oct. 25, 2018

Related U.S. Application Data

(63) Continuation of application No. PCT/JP2016/005251, filed on Dec. 28, 2016.

(30) Foreign Application Priority Data

Jan. 5, 2016 (JP) .................. 2016-000746
Feb. 17, 2016 (JP) .................. 2016-027909
May 27, 2016 (JP) .................. 2016-106189

(51) Int. Cl.
B41J 2/005 (2006.01)
C09D 11/38 (2014.01)
(Continued)

(52) U.S. Cl.
CPC .......... *B41J 2/0057* (2013.01); *B41M 5/0017* (2013.01); *B41M 5/0256* (2013.01);
(Continued)

(58) Field of Classification Search
CPC ...... B41J 2/0057; B41M 5/03; B41M 5/0256; B41M 7/0018; B41M 5/0017; B41M 7/00;
(Continued)

(56) References Cited

U.S. PATENT DOCUMENTS 5,841,456 A 11/1998 Takei et al.
6,916,081 B2 7/2005 Nakashima
(Continued)

FOREIGN PATENT DOCUMENTS

CN 1990241 A 7/2007
CN 101332708 A 12/2008
(Continued)

OTHER PUBLICATIONS

Search Report and Written Opinion in Singapore Application No. 11201805829P (dated Sep. 17, 2018).
(Continued)

*Primary Examiner* — Henok D Legesse
(74) *Attorney, Agent, or Firm* — Venable LLP

(57) ABSTRACT

An ink jet recording method repeatedly performing the following steps on a transfer body, a step of forming a first image including a liquid component containing water and a water-soluble organic solvent and an insoluble solid content; a liquid removing step of forming a second image, from which a part of a liquid component contained in the first image is removed; and a transferring step of transferring the second image onto a recording medium by heating the second image to a temperature equal to or higher than a minimum filming temperature of the second image, wherein
(Continued)

the minimum filming temperature of the second image is a temperature equal to or higher than 100° C.; and the first image is not subjected to a heat history equal to or higher than a boiling point of the water after the step of forming the first image and before the liquid removing step.

14 Claims, 5 Drawing Sheets

(51) Int. Cl.
    *C09D 11/40* (2014.01)
    *B41M 5/03* (2006.01)
    *B41M 5/025* (2006.01)
    *B41M 5/00* (2006.01)
    *B41M 7/00* (2006.01)
    *C09D 11/322* (2014.01)
    *C09D 11/54* (2014.01)

(52) U.S. Cl.
    CPC ............ *B41M 5/03* (2013.01); *B41M 7/0018* (2013.01); *C09D 11/322* (2013.01); *C09D 11/38* (2013.01); *C09D 11/40* (2013.01); *C09D 11/54* (2013.01); *B41M 7/00* (2013.01); *B41M 7/009* (2013.01)

(58) Field of Classification Search
    CPC ........ B41M 7/009; C09D 11/38; C09D 11/40; C09D 11/322; C09D 11/54
    See application file for complete search history.

(56) References Cited

U.S. PATENT DOCUMENTS

| | | | |
|---|---|---|---|
| 7,129,284 B2 | 10/2006 | Ma et al. |
| 7,422,318 B2 | 9/2008 | Kadomatsu et al. |
| 7,481,526 B2 | 1/2009 | Inoue |
| 7,497,564 B2 | 3/2009 | Yui |
| 7,556,342 B2 | 7/2009 | Hamano |
| 7,594,722 B2 | 9/2009 | Kadomatsu et al. |
| 7,766,457 B2 | 8/2010 | Chen |
| 7,845,760 B2 | 12/2010 | Hirakawa |
| 7,926,933 B2 | 4/2011 | Taniuchi et al. |
| 8,226,225 B2 | 7/2012 | Yamanobe |
| 8,246,158 B2 | 8/2012 | Ageishi et al. |
| 8,857,962 B2 | 10/2014 | Goto et al. |
| 9,102,137 B2 | 8/2015 | Koitabashi et al. |
| 9,616,653 B2 | 4/2017 | Liu |
| 9,796,171 B2 | 10/2017 | Liu |
| 9,821,584 B2 | 11/2017 | Noguchi et al. |
| 10,005,272 B2 | 6/2018 | Noguchi et al. |
| 10,029,481 B2 | 7/2018 | Ohnishi et al. |
| 2006/0061642 A1 | 3/2006 | Ueki |
| 2006/0221166 A1 | 10/2006 | Inoue |
| 2007/0229586 A1 | 10/2007 | Hirakawa |
| 2008/0006176 A1 | 1/2008 | Houjou |
| 2008/0236480 A1 | 10/2008 | Furukawa et al. |
| 2009/0079784 A1* | 3/2009 | Chiwata ............... B41J 2/2114 347/21 |
| 2009/0317555 A1* | 12/2009 | Hori ...................... B41J 2/0057 427/428.06 |
| 2011/0069109 A1 | 3/2011 | Tojo |
| 2015/0306539 A1 | 10/2015 | Yamato |
| 2018/0297377 A1 | 10/2018 | Ohnishi et al. |
| 2018/0304616 A1 | 10/2018 | Honda et al. |
| 2018/0311951 A1 | 11/2018 | Sakamoto et al. |
| 2018/0319166 A1 | 11/2018 | Yamane et al. |
| 2018/0319179 A1 | 11/2018 | Yamane et al. |
| 2018/0319188 A1 | 11/2018 | Toyama et al. |
| 2018/0319189 A1 | 11/2018 | Ohnishi et al. |
| 2018/0319190 A1 | 11/2018 | Hirokawa et al. |
| 2018/0326719 A1 | 11/2018 | Masuda et al. |
| 2018/0326755 A1 | 11/2018 | Ohnishi et al. |

FOREIGN PATENT DOCUMENTS

| | | |
|---|---|---|
| CN | 100546832 C | 10/2009 |
| CN | 101607468 A | 12/2009 |
| CN | 103660656 A | 3/2014 |
| EP | 2 123 459 A2 | 11/2009 |
| EP | 2 777 941 A1 | 9/2014 |
| JP | 2000-103157 A | 4/2000 |
| JP | 2001-171143 A | 6/2001 |
| JP | 2001-179959 A | 7/2001 |
| JP | 2004-43047 A | 2/2004 |
| JP | 2004-181955 A | 7/2004 |
| JP | 2005-161610 A | 6/2005 |
| JP | 2006-82428 A | 3/2006 |
| JP | 2006-88486 A | 4/2006 |
| JP | 2006-102981 A | 4/2006 |
| JP | 2006-205677 A | 8/2006 |
| JP | 2006-264080 A | 10/2006 |
| JP | 2007-268974 A | 10/2007 |
| JP | 2007-268975 A | 10/2007 |
| JP | 4016559 B2 | 12/2007 |
| JP | 2008-19286 A | 1/2008 |
| JP | 2008-55852 A | 3/2008 |
| JP | 2008-087283 A | 4/2008 |
| JP | 2008-213333 A | 9/2008 |
| JP | 2008-246787 A | 10/2008 |
| JP | 2009-000915 A | 1/2009 |
| JP | 2009-000916 A | 1/2009 |
| JP | 2009-045851 A | 3/2009 |
| JP | 2009-061644 A | 3/2009 |
| JP | 2009-072927 A | 4/2009 |
| JP | 2009-086348 A | 4/2009 |
| JP | 2009-159116 A | 7/2009 |
| JP | 2009-166387 A | 7/2009 |
| JP | 2009-214439 A | 9/2009 |
| JP | 2009-226852 A | 10/2009 |
| JP | 2009-226907 A | 10/2009 |
| JP | 2009-234219 A | 10/2009 |
| JP | 2010-201796 A | 9/2010 |
| JP | 2011-63001 A | 3/2011 |
| JP | 2011-245865 A | 12/2011 |
| JP | 2012-116617 A | 6/2012 |
| JP | 2012-183798 A | 9/2012 |
| JP | 2013-10267 A | 1/2013 |
| JP | 2014-193599 A | 10/2014 |
| JP | 2015-16687 A | 1/2015 |
| JP | 2015-96562 A | 5/2015 |
| JP | 2015-098097 A | 5/2015 |
| JP | 2015-145117 A | 8/2015 |
| JP | 2015-150789 A | 8/2015 |
| JP | 2015-208881 A | 11/2015 |
| JP | 2016-120625 A | 7/2016 |
| WO | 2015/034027 A1 | 3/2015 |
| WO | 2017/119044 A1 | 7/2017 |
| WO | 2017/119045 A1 | 7/2017 |
| WO | 2017/119046 A1 | 7/2017 |
| WO | 2017/119047 A1 | 7/2017 |
| WO | 2017/119049 A1 | 7/2017 |
| WO | 2018/105215 A1 | 6/2018 |

OTHER PUBLICATIONS

U.S. Appl. No. 16/022,223, filed Jun. 28, 2018, Ohnishi et al.
U.S. Appl. No. 16/022,118, filed Jun. 28, 2018, Toyama et al.
U.S. Appl. No. 16/022,143, filed Jun. 28, 2018, Yamane et al.
U.S. Appl. No. 16/022,169, filed Jun. 28, 2018, Honda et al.
U.S. Appl. No. 16/018,182, filed Jun. 26, 2018, Ohnishi et al.
U.S. Appl. No. 16/013,276, filed Jun. 20, 2018, Ohnishi et al.
U.S. Appl. No. 16/015,734, filed Jun. 22, 2018, Hirokawa et al.
U.S. Appl. No. 16/025,548, filed Jul. 2, 2018, Moriguchi et al.
U.S. Appl. No. 16/019,905, filed Jun. 27, 2018, Torisaka et al.
U.S. Appl. No. 16/022,223, WO 2017/119046 A1.
U.S. Appl. No. 16/022,118, WO 2017/119044 A1.
U.S. Appl. No. 16/022,143, WO 2017/119045 A1.
U.S. Appl. No. 16/022,169, WO 2017/119047 A1.
JP 2008-19286, U.S. Publication No. 2008/0006176 A1.
JP 2014-19359, U.S. Pat. No. 9,102,137 B2.

(56) References Cited

OTHER PUBLICATIONS

JP 2004-181955, U.S. Pat. No. 7,129,284 B2.
JP 2009-166387, U.S. Pat. No. 8,857,962 B2.
JP 2015-16687, U.S. Pat. No. 9,821,584 B2.
International Search Report in International Application No. PCT/JP2016/005251 (dated Apr. 2017).
International Preliminary Report on Patentability in International Application No. PCT/JP2016/005251 (dated Jul. 2018).
Extended European Search Report in European Application No. 16883554.4 (dated Jul. 11, 2019).
Extended European Search Report in European Application No. 16883550.2 (dated Jul. 12, 2019).
Extended European Search Report in European Application No. 16883551.0 (dated Jul. 12, 2019).
Extended European Search Report in European Application No. 16883553.6 (dated Jul. 12, 2019).
Machine translation of JP 2008-213333 (Sep. 18, 2008).
Machine translation of JP 2009-061644 (Mar. 26, 2008).
Machine translation of JP 2015-098097 (May 28, 2008).
Machine translation of JP 2015-145117 (Aug. 13, 2015).
Extended European Search Report in European Application No. 16883546.0 (dated Jul. 23, 2019).
Extended European Search Report in European Application No. 16883549.4 (dated Jul. 23, 2019).
First Office Action in Chinese Application No. 201680078027.X (dated Apr. 25, 2019).
First Office Action in Chinese Application No. 201680078100.3 (dated Apr. 25, 2019).
First Office Action in Chinese Application No. 201680078028.4 (dated Apr. 28, 2019).
First Office Action in Chinese Application No. 201680078084.8 (dated May 24, 2019).

\* cited by examiner

TRANSFER TYPE INK JET RECORDING METHOD WITH COOLED TRANSFER BODY

CROSS-REFERENCE TO RELATED APPLICATIONS

This application is a continuation of International Application No. PCT/JP2016/005251, filed Dec. 28, 2016, which claims the benefit of Japanese Patent Application No. 2016-027909, filed Feb. 17, 2016, Japanese Patent Application No. 2016-000746, filed Jan. 5, 2016, and Japanese Patent Application No. 2016-106189, filed May 27, 2016, all of which are hereby incorporated by reference herein their entirety.

BACKGROUND OF THE INVENTION

Field of the Invention

The present invention relates to an ink jet recording method.

Bleeding in which inks applied adjacent to each other are mixed with each other or beading in which the previously landed ink is attracted to subsequently landed ink may occur during image recording by an ink jet system.

Description of the Related Art

In contrast, technologies for applying a reaction liquid (referred to as a treatment liquid) for increasing a viscosity of an ink image by agglomerating a solid content, such as a coloring material, in ink and suppressing bleeding or beading by suppressing an interference between droplet-ejecting dots, prior to applying the ink have been known.

In addition, a recording medium excessively absorbs liquid components in the ink image, thereby causing curling or cockling. In particular, a method for applying a reaction liquid and then applying ink applies two liquid compositions to tend to increase a total applying amount of liquid components.

As one of the methods for solving such problems, there is a method for reducing deterioration in image quality by drying the recording medium by means of hot air, infrared rays or the like. In addition, there is a method for forming an image on a transfer body, drying a liquid component included in the image on the transfer body by means of heat energy and transferring the image to a recording medium such as paper.

In addition, there is a method for absorbing and removing a liquid component from ink on a transfer body by using a porous body as a liquid absorbing member without using heat energy as a member which removes the liquid component contained in the image on the transfer body (Japanese Patent Application Laid-Open No. 2008-19286).

On the other hand, aqueous ink containing water as a main liquid component is used as environmentally-friendly ink. In the case of the aqueous ink, there is a need to add at least about 10 to 30% by mass of high boiling point solvents to prevent a nozzle from being clogged due to drying (see Japanese Patent Application Laid-Open No. 2009-226907). Japanese Patent Application Laid-Open No. 2009-226907 discloses that although these high boiling point solvents (wetting agents) have relatively low viscosity in a state of an aqueous solution, there is a problem in that the concentration of the high boiling point solvents is increased due to evaporation of moisture and the viscosity thereof is increased accordingly, and the recording medium is curled due to stickiness of an ink layer and a delay of drying.

In addition, Japanese Patent Application Laid-Open No. 2009-226907 discloses that when an image is formed on a recording medium by using an ink containing a coloring material and a treatment liquid containing a component that aggregates the coloring material, the ink layer formed after the treatment liquid is applied and the ink is droplet-ejected is heated and dried, and then residual solvents remaining on the recording medium are removed by coming into contact with a solvent removing member.

SUMMARY OF THE INVENTION

As disclosed in Japanese Patent Application Laid-Open No. 2008-19286, a transfer type ink jet recording method for forming an ink image on a transfer body using aqueous ink and transferring the formed image to a recording medium such as paper carries out the transfer by reducing a liquid component from an ink image on the transfer body and heating the ink image to a temperature which is equal to or higher than a minimum filming temperature (MFT) of a solid content (resin emulsion) in the ink image. Although Japanese Patent Application Laid-Open No. 2008-19286 discloses that the transfer can be made at a low temperature by using the resin emulsion having a low MFT equal to or lower than 70° C., there is a possibility that the image using the resin emulsion having the low MFT equal to or lower than 70° C. deteriorates in fastness.

In addition, as disclosed in Japanese Patent Application Laid-Open No. 2009-226907, the configuration in which the liquid component is further absorbed by the liquid absorbing member after the heating may be effective in the case of forming an image directly on the recording medium. However, there was a case in which a stable transferability may not be obtained if the transfer type ink jet recording method as disclosed in Japanese Patent Application Laid-Open No. 2008-19286 is applied and the image is formed at high speed.

According to the present invention, it is an object of the present invention to provide an ink jet recording method having transferability and fastness of an image in an ink jet recording method for performing image formation and liquid absorption on a transfer body and transferring the image onto a recording medium.

According to an embodiment of the present invention, provided is an ink jet recording method repeatedly performing the following steps on a transfer body, the ink jet recording method including: a step of forming a first image including a liquid component containing water and a water-soluble organic solvent having a boiling point higher than that of the water and an insoluble solid content contained in the liquid component formed by mixing a reaction liquid with ink by a step of applying a reaction liquid containing an ink viscosity-increasing component and a step of applying the ink containing the water and a coloring material onto the transfer body; a liquid removing step of forming a second image, from which a part of a liquid component contained in the first image is removed, by bringing a porous body into contact with the transfer body on which the first image is formed; and a transferring step of transferring the second image onto a recording medium by heating the second image to a temperature equal to or higher than a minimum filming temperature of the second image, wherein the minimum filming temperature of the second image is a temperature equal to or higher than 100° C.; and the first image is not subjected to a heat history equal to or higher than a boiling point of the water after the step of forming the first image and before the liquid removing step.

In addition, according to another embodiment of the present invention, there is provided an ink jet recording method repeatedly performing the following steps on a transfer body, the ink jet recording method including: a step of forming a first image including a liquid component containing water and a water-soluble organic solvent having a boiling point higher than that of the water and an insoluble solid content contained in the liquid component formed by mixing a reaction liquid with ink by a step of applying the reaction liquid containing an ink viscosity-increasing component onto the transfer body and a step of applying the ink containing the water and a coloring material; a liquid removing step of forming a second image by concentrating ink constituting the first image by bringing a porous body into contact with the transfer body on which the first image is formed; and a transferring step of transferring the second image onto a recording medium by heating the second image to a temperature equal to or higher than a minimum filming temperature of the second image, wherein the minimum filming temperature of the second image is a temperature equal to or higher than 100° C., and the first image is not subjected to a heat history equal to or higher than a boiling point of the water after the step of forming the first image and before the liquid removing step.

Further features of the present invention will become apparent from the following description of exemplary embodiments with reference to the attached drawings.

DESCRIPTION OF THE EMBODIMENTS

Figure 1:
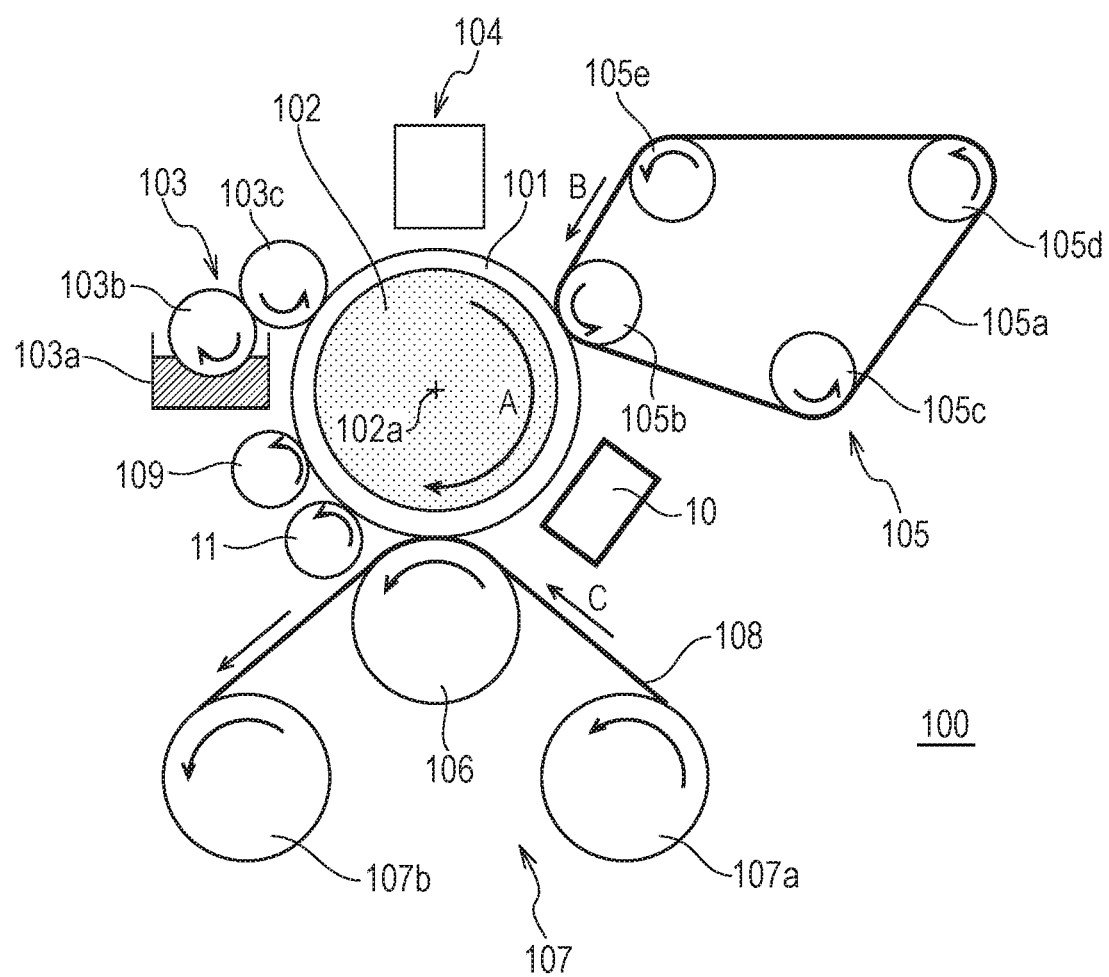
FIG. 1 is a schematic diagram of an example of a configuration of a transfer type ink jet recording apparatus according to the present invention.

Preferred embodiments of the present invention will now be described in detail in accordance with the accompanying drawings.

As a result of repeated researches from various viewpoints by the present inventors, the present inventors got the idea that it is preferable that an MFT of a solid component (resin emulsion) in an ink image is equal to or higher than 100° C., for example, to increase fastness of an image. In this condition, it is also important that the temperature of the solid component (resin emulsion) in the ink image is equal to or higher than 100° C. during transferring to ensure even transferability.

On the other hand, in the case of transfer recording, we obtained a new knowledge that there is a favorable order for drying by heating and removing liquid components by a liquid absorbing member.

Hereinafter, the present invention will be described in detail with reference to preferable embodiments.

According to an embodiment of the present invention, there is provided an ink jet recording method repeatedly performing the following steps on a transfer body, the ink jet recording method including: a step of forming a first image including a liquid component containing water and a water-soluble organic solvent having a boiling point higher than that of the water and an insoluble solid content contained in the liquid component formed by mixing a reaction liquid with ink by a step of applying the reaction liquid containing an ink viscosity-increasing component and applying a step of the ink containing the water and a coloring material onto the transfer body; a liquid removing step of forming a second image, from which a part of a liquid component contained in the first image is removed, by bringing a porous body into contact with the transfer body on which the first image is formed; and a transferring step of transferring the second image onto the recording medium by heating the second image to a temperature equal to or higher than a minimum filming temperature of the second image, wherein the minimum filming temperature of the second image is equal to or higher than 100° C., and the first image is not subjected to a heat history equal to or higher than a boiling point of the water after the step of forming the first image and before the liquid removing step.

In particular, the step of forming the first image includes the step of applying the reaction liquid containing the ink viscosity-increasing component onto the transfer body and the step of applying the ink. Although the order of the step of applying the reaction liquid onto the transfer body and the step of applying the ink onto the transfer body is not particularly limited, from the viewpoint of increasing the quality of the image, it is preferable that the step of forming the first image includes the step of applying the reaction liquid onto the transfer body and the step of applying the ink onto the transfer body in this order. That is, it is preferable that the step of forming the first image includes the step of applying the reaction liquid onto the transfer body and the step of applying the ink onto the transfer body so that the ink at least partially overlaps with a region to which the reaction liquid is applied, in this order. Therefore, it is preferable that an apparatus for applying a reaction liquid onto a transfer body and an apparatus for applying ink onto a transfer body are arranged to apply the reaction liquid onto the transfer body and apply the ink so that the ink at least partially overlaps with a region to which the reaction liquid is applied.

Hereinafter, an ink jet recording method according to the embodiment which records a first image by applying a reaction liquid and applying ink will be described. It should be noted that the first image refers to an ink image before the liquid removal prior to being subjected to the liquid absorbing treatment by the liquid absorbing member. An ink image after the liquid removal in which the content of the first liquid is reduced by performing the liquid absorbing treatment refers to the second image. In addition, in the following description, as the pretreatment for the porous body used for the liquid absorbing member, the treatment of moistening the porous body with the wetting liquid in advance will be described.

<Transfer Body>

The transfer body applied to the present invention has a surface layer including an image forming surface. As a member of the surface layer, various materials such as resin and ceramic can be appropriately used, but a material having high compressive elastic modulus is preferable in terms of durability or the like. Specific examples of the material may include an acrylic resin, an acrylic silicone resin, a fluorine-containing resin, a condensate obtained by condensing a hydrolysable organosilicon compound or the like. Surface treatment may be performed to improve wettability, transferability or the like of the reaction liquid. Examples of the surface treatment may include frame treatment, corona treatment, plasma treatment, polishing treatment, roughening treatment, active energy ray irradiation treatment, ozone treatment, surfactant treatment, silane coupling treatment or the like. The plurality of combinations thereof may also be used. In addition, arbitrary surface shapes may be provided on the surface layer.

It is preferable that the transfer body applied to the present invention has a compressible layer which has a function of absorbing a pressure fluctuation. By providing the compressible layer, the compressible layer can absorb deformation, disperse the pressure fluctuation in response to a local pressure fluctuation and maintain good transferability even at the time of high speed printing. Examples of the member of the compressible layer may include acrylonitrile-butadiene rubber, acrylic rubber, chloroprene rubber, urethane rubber, silicone rubber or the like.

It is preferable that a porous material is formed by blending a predetermined amount of vulcanizing agent, a vulcanization accelerator or the like at the time of molding the rubber material, and further blending fillers such as a foaming agent, hollow fine particles and sodium chloride if necessary. As a result, a bubble part is compressed with its volume change in response to various pressure fluctuations, so a deformation in a direction other than a compressible direction is small and more stable transferability and durability can be obtained. As the porous rubber materials, there are materials having a continuous pore structure in which each pore is continuous with each other and an independent pore structure in which each pore is independent from each other. In the present invention, any of the structures may be used, and these structures may be used in combination.

It is preferable that the transfer body applied to the present invention has an elastic layer between the surface layer and the compressible layer. As the member of the elastic layer, various materials such as resin and ceramics can be appropriately used. In terms of the processing characteristics or the like, various elastomer materials and rubber materials are preferably used. Specific examples may include fluorosilicone rubber, phenyl silicone rubber, fluororubber, chloroprene rubber, urethane rubber, nitrile rubber, ethylene propylene rubber, natural rubber, styrene rubber, isoprene rubber, butadiene rubber, ethylene/propylene/butadiene copolymer, nitrile butadiene rubber or the like. The silicone rubber, the fluorosilicone rubber and the phenyl silicone rubber are particularly preferable in dimensional stability and durability because they have small compression set. In addition, it is preferable that the change in elastic modulus due to temperature is small, which is also preferable in terms of transferability.

In the present invention, various adhesives or double-sided tapes may be used between the surface layer, the elastic layer and the compressible layer to fix and hold the surface layer, the elastic layer and the compressible layer. In addition, a reinforcing layer having a high compression elastic modulus may be provided to suppress lateral extension or maintain stiffness when being in the apparatus. In addition, woven fabric may be used as a reinforcing layer. The transfer body can be produced by arbitrarily combining the respective layers by the material.

The size of the transfer body can be freely selected according to the size of the target print image. The shape of the transfer body is not particularly limited, and specific examples of the shape of the transfer body may include a sheet shape, a roller shape, a belt shape, an endless web form or the like.

<Reaction Liquid Applying Step>

For the applying of the reaction liquid, any apparatus capable of applying the reaction liquid onto the transfer body may be used and various apparatuses which are known conventionally can be suitably used. Specific examples of the apparatus may include a gravure offset roller, an ink jet head, a die coating device (die coater), a blade coating device (blade coater) or the like. In particular, an apparatus capable of uniformly applying a reaction liquid to all regions on the transfer body, which can be applied by an ink applying device to be described later, is preferable. By applying the reaction liquid prior to applying ink, bleeding in which inks applied adjacent to each other are mixed with each other or beading in which the previously landed ink is attracted to subsequently landed ink may be suppressed during image recording by an ink jet system.

<Reaction Liquid>

The reaction liquid contains a component that increases viscosity of ink (ink viscosity-increasing component). Here, the increase in viscosity of an ink means that the coloring material, the resin and the like, which are components forming the ink, chemically react or are physically adsorbed by coming into contact with the ink viscosity-increasing component, thereby observing the increase in the viscosity of the ink. The increase in viscosity of an ink includes not only the case in which the increase in viscosity of ink is observed but also the case in which the viscosity is locally increased by agglomerating a part of the components constituting the ink such as the coloring material and the resin. The ink viscosity-increasing component lowers flowability of the ink on the transfer body and/or a part of the components forming the ink, thereby suppressing the bleeding or the beading during the formation of the first image.

In the present invention, the increase in viscosity of ink is also referred to as "thickening ink". As the ink viscosity-increasing component, known components such as polyvalent metal ions, organic acids, cationic polymers, porous fine particles or the like can be used. Among those, in particular, the polyvalent metal ions and the organic acids are preferable. In addition, it is also preferable to contain plural types of ink viscosity-increasing components. The content of the ink viscosity-increasing component in the reaction liquid is preferably 5% by mass or more with respect to the total mass of the reaction liquid.

Examples of the polyvalent metal ions may include divalent metal ions such as $Ca^{2+}$, $Cu^{2+}$, $Ni^{2+}$, $Mg^{2+}$, $Sr^{2+}$, $Ba^{2+}$ and $Zn^{2+}$ and trivalent metal ions such as $Fe^{3+}$, $Cr^{3+}$, $Y^{3+}$ and $Al^{3+}$.

In addition, examples of the organic acid may include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furancarboxylic acid, pyridine carboxylic acid, coumaric acid, thiophene carboxylic acid, nicotinic acid, oxysuccinic acid, dioxysuccinic acid or the like.

The reaction liquid can include an appropriate amount of water or water-soluble organic solvent having a boiling point higher than that of water. In this case, the water used is preferably deionized water by ion exchange or the like. In addition, as the water-soluble organic solvent which can be used for the reaction liquid in the present embodiment is not particularly limited, and the water-soluble organic solvent which can be used for the ink to be described below can be used.

Further, the reaction liquid can be used by appropriately adjusting the surface tension or the viscosity thereof by adding a surfactant or a viscosity adjusting agent. As long as it can coexist with the ink viscosity-increasing component, the material used cannot be particularly limited. Specific examples of the surfactant to be used may include acetylene glycol ethylene oxide adduct ("Acetylenol E100" (trade name) manufactured by Kawaken Fine Chemicals Co., Ltd.), perfluoroalkyl ethylene oxide adduct ("Megafac F444", "Megafac TF-2066" and the like (trade names) manufactured by DIC Corporation) or the like.

It should be noted that the applying amount of the reaction liquid may be an apply amount which can form substantially the uniform layer when the reaction liquid is applied to the entire region on the transfer body, which can applied by the ink applying device. As a result, it is possible to suppress circularity of ink dots from being lowered. In addition, the excessive applying of the reaction liquid may contract the ink solid content more than necessary during an ink solid component aggregating step, which may lead to damage of the image quality. From this viewpoint, the applying amount of the reaction liquid in the present embodiment is preferably 0.05 $g/m^2$ or more to 2 $g/m^2$ or less, more preferably 0.1 $g/m^2$ or more to 1.3 $g/m^2$ or less.

<Ink Applying Step>

As the ink applying apparatus for applying ink, an ink jet head is used. As the ink jet head, there may be, for example, a type of discharging ink by forming bubbles which causes film boiling in ink by an electrothermal transducer, a type of discharging ink by an electro-mechanical transducer, a type of discharging ink using static electricity or the like. In the present embodiment, the known ink jet head can be used. Among those, in particular, from the viewpoint of high speed and high density printing, the ink jet head using the electrothermal transducer is preferably used. Drawing receives an image signal and applies a necessary ink amount to each position.

The ink applying amount can be expressed by an image concentration (duty) or an ink thickness, but in the present embodiment, a mass of each ink dot is multiplied by the applied number of ink dots, and an average value obtained by dividing the resultant by a printing area was defined as the ink applying amount ($g/m^2$). It should be noted that the maximum ink applying amount in the image region means the amount of ink applied at an area of at least 5 $mm^2$ or more in the region used as the information of the transfer body from the viewpoint of removing the liquid content in the ink.

The ink jet recording apparatus of the present embodiment may have a plurality of ink jet heads to apply the ink of each color onto the transfer body. For example, when each color image is formed by using yellow ink, magenta ink, cyan ink and black ink, the ink jet recording apparatus has four ink jet heads for discharging four kinds of inks, respectively, onto the transfer body.

In addition, the ink applying device may include an ink jet head which discharges ink (clear ink) not containing a coloring material.

<Ink>

Each component of the ink applied to the present embodiment will be described.

(Coloring Material)

A pigment or a mixture of a dye and a pigment can be used as the coloring material contained in the ink applied to the present embodiment. The kind of pigments which can be used as the coloring material is not particularly limited. Specific examples of the pigment may include inorganic pigments such as carbon black and organic pigments such as azos, phthalocyanines, quinacridones, isoindolinones, imidazolones, diketopyrrolopyrroles and dioxazines. One or two more kinds of pigments can be used if necessary.

The kind of dyes which can be used as the coloring material is not particularly limited. Specific examples of the dye may include direct dyes, acidic dyes, basic dyes, disperse dyes, edible dyes or the like and dyes having an anionic group can be used. Specific examples of the dye skeleton may include an azo skeleton, a triphenylmethane skeleton, a phthalocyanine skeleton, an azaphthalocyanine skeleton, a xanthene skeleton, an anthrapyridone skeleton or the like.

The content of the pigment in the ink is preferably 0.5% by mass or more to 15.0% by mass or less, more preferably 1.0% by mass or more to 10.0% by mass or less with respect to the total mass of the ink.

(Dispersant)

Known dispersants used for ink jet inks can be used as the dispersant for dispersing the pigment. Among those, in the present embodiment, a water-soluble dispersant having both a hydrophilic part and a hydrophobic part in the structure is preferably used. In particular, a pigment dispersant formed of a resin which is copolymerized with at least a hydrophilic monomer and a hydrophobic monomer is preferably used. Each monomer used here is not particularly limited, but the known monomers are preferably used. Specific examples of the hydrophobic monomer may include styrene and other styrene derivatives, alkyl (meth) acrylate, benzyl (meth) acrylate or the like. In addition, examples of the hydrophilic monomer may include acrylic acid, methacrylic acid, maleic acid or the like.

The dispersant preferably has an acid value of 50 mg KOH/g or more to 550 mg KOH/g or less. In addition, the dispersant preferably has a weight average molecular weight of 1000 or more to 50000 or less. It should be noted that a mass ratio (pigment:dispersant) of the pigment and the dispersant preferably ranges from 1:0.1 to 1:3.

In addition, it is preferable to use a so-called self-dispersible pigment in which the pigment itself is surface-modified to be dispersed without using a dispersant.

(Resin Fine Particles)

The ink used in the present embodiment can be used by containing various fine particles not having a coloring material. Among those, the resin fine particles are preferable because the improvement in image quality and fixing property may be effective. As the material of the resin fine particle used in the present embodiment, the known resins which are not particularly limited can be appropriately used. Specific examples of the material may include homopolymers such as polyolefin, polystyrene, polyurethane, polyester, polyether, polyurea, polyamide, polyvinyl alcohol, poly (meth) acrylic acid and a salt thereof, poly (meth) alkyl acrylate, polydiene or a copolymer in which a plurality of monomers for producing a homopolymer thereof are polymerized.

The weight average molecular weight (Mw) of the resin preferably ranges from 1,000 or more to 2,000,000 or less. In addition, the amount of the resin fine particles in the ink is preferably 1% by mass or more to 50% by mass or less, more preferably 2% by mass or more to 40% by mass or less with respect to the total mass of ink.

Further, in the aspect of the present embodiment, it is preferable to be used as the resin fine particle dispersion in which the resin fine particles are dispersed in a liquid. There is no particular limitation on the dispersion method, but it is preferable to use a so-called self-dispersible type fine resin particle dispersion which is dispersed using a resin in which a monomer having a dissociable group is homopolymerized or plural types of monomers are copolymerized. Here, examples of the dissociable group may include a carboxyl group, a sulfonic acid group, a phosphoric acid group or the like, and examples of the monomer having the dissociable group include acrylic acid, methacrylic acid or the like. In addition, a so-called emulsifying dispersing type resin fine particle dispersion in which the resin particles are dispersed by an emulsifier can also be similarly applied to the present embodiment.

As the emulsifier mentioned herein, the known surfactant is preferred regardless of a low molecular weight and a high molecular weight. As the surfactant, a nonionic surfactant or a surfactant having the same charge as the resin fine particles is preferable.

The resin fine particle dispersion used in the present embodiment preferably has a dispersion particle size of 10 nm or to and 1000 nm or less, and more preferably a dispersion particle diameter of 100 nm or to and 500 nm or less.

In addition, it is also preferable to add various additives for stabilization at the time of preparing the fine resin particle dispersion used in the present embodiment. Examples of the additives may include n-hexadecane, dodecyl methacrylate, stearyl methacrylate, chlorobenzene, dodecyl mercaptan, blue dye (bluing agent), polymethyl methacrylate or the like.

In particular, the ink according to the present embodiment preferably contains a film forming component having a minimum filming temperature of 100° C. or higher. As the film forming component for that purpose, it is preferable that wax particles are included in addition to the resin fine particles.

It is estimated that since the ink contains the wax particles, when the image is heated to exceed the minimum filming temperature (MFT), the film formation is rapidly progressed and the transferability is improved. Examples of the components of the wax particles may include natural wax and synthetic wax. Examples of the natural wax may include petroleum waxes, plant waxes, animal, plant waxes or the like. Examples of the petroleum waxes may include paraffin wax, micro crystalline wax, petrolatum or the like. In addition, examples of the plant waxes may include carnauba wax, candelilla wax, rice wax, wood braze or the like. In addition, examples of the animal and plant waxes may include lanolin, beeswax or the like. Examples of the synthetic waxes may include synthetic hydrocarbon wax, modified wax or the like. Examples of the synthetic hydrocarbon wax may include polyethylene wax, Fischer-Tropsch wax or the like. Examples of the modified wax may include paraffin wax derivatives, montan wax derivatives, microcrystalline wax derivatives or the like. One kind of these waxes may be used alone, or two or to kinds of them may be used in combination.

It is preferable that the wax particles are added to the ink in the form of the wax particle dispersion in which the wax particles are dispersed in a liquid. It is preferable that the wax particles are formed by dispersing the wax component by the dispersant. Although the dispersant is not particularly limited, for example, the known dispersant can be used, but it is preferable to select a dispersant in consideration of the stability of the dispersed state in the ink.

In addition, the average particle size (number-based 90% particle diameter) of the wax particles is preferably 1 µm or less in consideration of the discharge property of the ink using the ink jet system.

(Curing Component)

In the present invention, it is preferable that a component which is cured by active energy rays in either the reaction liquid or the ink. There is a case in which the coloring material adhesion to the liquid absorbing member is suppressed by curing the component cured by the active energy rays before the liquid removing step.

As the component to be cured by the irradiation with the active energy ray used in the present invention, the component which is cured by the irradiation with the active energy rays and becomes insoluble before the irradiation is used. For example, a general ultraviolet curable resin can be used. Although a large amount of ultraviolet curing resin is insoluble in water, as the material which can be adapted to the aqueous ink suitably used in the present invention, it is preferable that the structure has at least an ethylenically unsaturated bond curable by ultraviolet rays and has a hydrophilic linking group. Examples of the linking group for providing hydrophilic properties may include a hydroxyl group, a carboxyl group, a phosphoric acid group, a sulfonic acid group and salts thereof, an ether bond, an amide bond or the like. In addition, it is preferable that the curing component used in the present invention is hydrophilic.

In addition, examples of the active energy rays may include ultraviolet rays, infrared rays, an electron beam and the like.

In addition, in the present invention, it is preferable that a polymerization initiator is contained in either the reaction liquid or the ink. The polymerization initiator used in the present invention may be any compound as long as it generates radicals by the active energy rays.

In addition, it is one of extremely preferable embodiments to use together a sensitizer, which serves to increase an absorption wavelength of light, to improve a reaction rate.

(Surfactant)

The ink which can be used in the present embodiment may include a surfactant. Specific examples of the surfactant may include acetylene glycol ethylene oxide adduct (Acetylenol E100, manufactured by Kawaken Fine Chemical Co., Ltd.) and the like. The amount of the surfactant in the ink is preferably 0.01% by mass or more to 5.0% by mass or less with respect to the total mass of ink.

(Water and Water-Soluble Organic Solvent)

The ink used in the present embodiment contains water as a liquid medium (solvent or dispersion medium). The water is preferably water deionized by ion exchange or the like. In addition, the content of water in the ink is preferably 30% by mass or more to 97% by mass with respect to the total mass of ink, more preferably 50% by mass or more to 95% by mass or less with respect to the total amount of ink.

In addition, the ink may contain a water-soluble organic solvent. The kind of water-soluble organic solvents is not particularly limited and any known organic solvent can be used. Specific examples of the water-soluble organic solvent may include glycerin, diethylene glycol, polyethylene glycol, polypropylene glycol, ethylene glycol, propylene glycol, butylene glycol, triethylene glycol, thiodiglycol, hexylene glycol, ethylene glycol monomethyl ether, diethylene glycol monomethyl ether and 2-pyrrolidone, which have a boiling point higher than that of water. In addition, the water-soluble organic solvent can also include ethanol, methanol or the like which have a boiling point lower than that of water. Of course, it is also possible to use a mixture of two or more kinds selected from them.

In addition, the content of the water-soluble organic solvent in the ink is preferably 3% by mass or more to 70% by mass or less with respect to the total mass of ink. It should be noted that the water-soluble organic solvent having a boiling point higher than that of water may also be referred to as a water-soluble organic solvent having a high boiling point.

Although details will be described later, in the present invention, it is preferable that the first image is not subjected to a heat history equal to or higher than the boiling point of the water after the first image forming step and before the liquid removing step. The boiling point of the water in the present invention refers to a boiling point value of water under the atmospheric pressure.

In the present invention, it is preferable that water is a main component of a liquid medium in the ink. The water which is a main component of a liquid medium in the ink is suitable for an ink jet head utilizing an electrothermal transducer which can perform printing at a high speed and a high density.

(Other Additives)

In addition to the above components, the ink which can be used for the present embodiment may contain, if necessary, various additives such as a pH adjusting agent, a rust-preventive agent, an antiseptic agent, a mildewproofing agent, an antioxidant, a reduction inhibitor, a water-soluble resin and a neutralizer thereof and a viscosity modifier.

The first image formed of the mixture of the reaction liquid and the ink contains water as a liquid component and a water-soluble organic solvent having a boiling point higher than that of water. Therefore, at least one of the reaction liquid and the ink contains a water-soluble organic solvent having a boiling point higher than that of water. It is preferable that a water-soluble organic solvent having a boiling point higher than that of water in the first image is contained in an amount of 3% by mass or more of the entire image, and water is contained in a larger amount than the water-soluble organic solvent.

<Liquid Removing Step>

In the present embodiment, by bringing the liquid absorbing member having the porous body into contact with the first image, the liquid component is absorbed and the content of the liquid component in the first image is reduced. A contact surface of the liquid absorbing member with the first image is defined as a first surface, and the porous body is disposed on the first surface. It is preferable that the liquid absorbing member having such a porous body has a shape in which it moves in conjunction with the movement of the transfer body and is circulated while coming into contact with the first image and then re-contact with another first image at a predetermined cycle to be able to absorb a liquid. Examples of the shape may include an endless belt shape, a drum shape or the like. It should be noted that the liquid removing step may be referred to as a liquid absorbing step.

Further, in the present embodiment, it is preferable that the temperature of the first image after the first image forming step and before the liquid removing step is lower than the boiling point of the water. Among those, it is preferable that the temperature of the first image after the ink applying step and before the liquid removing step is lower than the boiling point of the water.

As a result of intensive investigation by the inventors of the present invention, if the water contained in the ink evaporates to a large extent after the first image forming step and before the liquid removing step, it was known that there is a case in which removal performance of a subordinate solvent (water-soluble organic solvent) having a boiling point higher than water deteriorates in the liquid removing step. This is estimated because the absolute liquid amount remaining in the coloring material and between the resin fine particles in the image becomes constant regardless of the increase in viscosity due to the evaporation of the ink liquid medium and the degree of evaporation, whereby the ratio of the subordinate solvent having the high boiling point contained in the remaining liquid is increased and the liquid amount of the subordinate solvent having the high boiling point remaining after the drying is increased.

When the remaining amount of the liquid contained in the image is large, the scratch resistance of the image is lowered, so the temperature of the image after the first image forming step and before the liquid removing step is lower than the boiling point of the water contained in the ink. Accordingly, it is important that the first image is not subjected to the heat history equal to or higher than the boiling point of the water after the first image forming step and before the liquid removing step.

In addition, it is preferable that the maximum temperature of the first image after the first image forming step and before the liquid removing step is lower than the boiling point of the water contained in the ink by 30° C. or more. That is, it is preferable that the maximum temperature of the first image is equal to or lower than 70° C. It is considered that the liquid absorbing performance is improved because the evaporation suppression becomes more conspicuous at a temperature difference equal to or higher than a certain temperature between the maximum temperature of the first image and the boiling point of the water.

Further, it is preferable that the amount of the water-soluble organic solvent having the boiling point higher than that of water in the second image immediately after the second image formation is equal to or less than 0.9 g/m$^2$. It is possible to keep the fastness of the image high by reducing the amount of water-soluble organic solvent having the boiling point higher than that of the water in the second image to 0.9 g/m$^2$ or less.

(Porous Body)

It is preferable to use a substance having an average pore diameter on a first surface side smaller than that on a second surface side opposite to the first surface as the porous body of the liquid absorbing member according to the present embodiment. To suppress the adhesion of the ink solid content (solid content formed by mixing the reaction liquid with the ink) onto the porous body, it is preferable that the pore diameter is small, and the average pore diameter of the porous body on the first surface side contacting at least the image is equal to or less than 10 μm. In the present embodiment, the average pore diameter refers to the average diameters on the first surface or the second surface, and can be measured by known means such as a mercury press-in method, a nitrogen adsorption method, an SEM image observation or the like.

In addition, it is preferable to reduce the thickness of the porous body so as to obtain a uniformly high air permeability. The air permeability can be indicated by the Gurley value defined in JIS P8117, and the Gurley value is preferably 10 seconds or less. However, if the porous body is made thin, there are cases where it is not possible to sufficiently secure the capacity necessary for absorbing the liquid component, so it is possible to make the porous body into a multilayer structure.

Next, the embodiment in which the porous body is made into the multilayer structure will be described. Here, the side contacting the first image will be described as the first layer, and the layer laminated on the surface opposite to the contact surface with the first image of the first layer will be described as the second layer. Further, the structure of the multilayer is sequentially expressed in the order of lamination from the first layer. In the specification, the first layer may be referred to as an "absorbing layer" and a second layer and a layer subsequent to the second layer may be referred to as a "support layer". In the present invention, the porous body may be a material having a large number of pores, and for example, a material having a large number of pores formed by intersection of fibers is also included in the porous body in the present invention.

[First Layer]

In the present embodiment, the material of the first layer is not particularly limited, and any of a hydrophilic material having a contact angle with respect to water of less than 90° and a water-repellent material having a contact angle of 90° or more can be used. The hydrophilic material is preferably selected from a single material such as cellulose and polyacrylamide, a composite material thereof or the like. In addition, it is also possible to use the water-repellent material whose surface is subjected to the hydrophilic treatment. Examples of the hydrophilic treatment may include a sputter etching method, a method such as irradiation with radiation, $H_2O$ ion irradiation and excimer (ultraviolet) laser light irradiation.

In the case of the hydrophilic material, it is more preferable that the contact angle with water is equal to or less than 60°. In the case of the hydrophilic material, there is an effect of sucking up liquid, particularly water by a capillary force.

On the other hand, in view of suppressing the coloring material adhesion and enhancing the cleaning performance, it is preferable that the material of the first layer is a water-repellent material having low surface free energy, particularly, a fluororesin. Specific examples of the fluororesin may include polytetrafluoroethylene (hereinafter, PTFE), polychlorotrifluoroethylene (PCTFE), polyvinylidene fluoride (PVDF), polyvinyl fluoride (PVF), perfluoroalkoxy fluorine resin (PFA), tetrafluoroethylene-.hexafluoropropylene copolymers (FEP), ethylene.tetrafluoroethylene copolymer (ETFE), ethylene.chlorotrifluoroethylene copolymer (ECTFE) or the like. One or two more kinds of resins can be used if necessary, and the configuration in which a plurality of films are laminated in the first layer may be adopted.

In the case of the water-repellent material, there is almost no effect of sucking up the liquid by the capillary force, and it takes time to suck up the liquid for the first time at the time of contacting the image. Therefore, it is preferable that the liquid having the contact angle with the first layer of less than 90° is impregnated into the first layer.

With respect to the liquid in the first image, the liquid impregnated into the first layer may be referred to as a pre-penetrant. As the pre-penetrant, the reaction liquid can be used. The liquid can be impregnated into the first layer by being coated from the first surface of the liquid absorbing member. It is preferable that the pre-penetrant is prepared by mixing a surfactant or a liquid, which has a low contact angle with the first layer, with the first liquid (water).

In the present embodiment, a film thickness of the first layer is preferably 50 μm or less. The film thickness of the first layer is more preferably 30 μm or less. In the embodiment to be described below, the film thickness is obtained by measuring a film thickness of arbitrary 10 points by a linear advance micrometer OMV 25 (manufactured by Mitutoyo Corporation) and calculating the average value thereof.

The first layer can be produced by the known method for producing a thin film porous membrane. For example, the first layer can be obtained by making a resin material into a sheet material by a method such as extrusion molding and then stretching the sheet material to a predetermined thickness. In addition, the first layer can be obtained as a porous membrane by adding a plasticizer such as paraffin to a material at the time of the extrusion molding and removing the plasticizer by heating or the like at the time of stretching. The pore diameter can be controlled by appropriately adjusting the amount of plasticizer to be added, a draw ratio and the like.

[Second Layer]

The second layer is preferably a layer having air permeability. Such a layer may be a nonwoven fabric of resin fiber or a woven fabric. Although the material of the second layer is not particularly limited, it is preferable that the material of the second layer is a material having the same or lower contact angle with the first liquid as compared to the first layer so that the liquid absorbed into the first layer side does not reflow. Specifically, the material of the second layer may preferably selected from a single material such as polyolefin (polyethylene (PE), polypropylene (PP) or the like), polyurethane, polyamide such as nylon, polyester (polyethylene terephthalate (PET) or the like) and polysulfone (PSF) or a composite material thereof. In addition, the second layer is preferably a layer having a pore diameter larger than that of the first layer.

[Third Layer]

A porous body having a multilayer structure may have a structure of three or more layers, but the structure of the porous body is not limited thereto. From the viewpoint of rigidity, a nonwoven fabric is preferably used for layers after a $3^{rd}$ layer (also referred to as a third layer). As the material, the same material as the second layer is used.

[Other Materials]

The liquid absorbing member may have a reinforcing member for reinforcing the side surface of the liquid absorbing member, in addition to the porous body having the above-described laminated structure. In addition, the liquid absorbing member may have a joining member as a belt-shaped member for joining longitudinal end portions of a long sheet-shaped porous body. As such a material, a non-porous tape material or the like can be used, which may be arranged at a position or a period which is not in contact with an image.

[Method for Producing Porous Body]

The method for forming a porous body by laminating a first layer and a second layer is not particularly limited. The first layer and the second layer may overlap each other, and may also adhere to each other by a method such as lamination by an adhesive agent or lamination by heating. From the viewpoint of the air permeability, the lamination by heating is preferable in the present embodiment. In addition, for example, the first layer or the second layer is partially melted by heating to be adhesively laminated to each other. Alternatively, the first layer and the second layer may be adhesively laminated to each other by interposing a fusing material such as hot melt powder between the first layer and the second layer and heating the fusing material. In the case of laminating the third layer or more, these layers may be laminated at once or laminated in order, and the laminating order is appropriately selected.

In the heating step, a lamination method for heating a porous body while holding the porous body between heated rollers and pressing the porous body with the rollers is preferable.

<Transferring Step>

A part of the liquid component is removed from the first image in the porous body to form a second image. Then, the second image is heated to be transferred onto a recording medium.

(Heating of the Second Image)

In the present embodiment, a part (for example, resin fine particles or aggregates of the resin fine particles) of the solid content in the second image is softened by heating the second image on the transfer body, so the second image is transferred onto a recording medium such as paper. At this time, it is estimated that the resin fine particles are heated to a temperature equal to or higher than a minimum filming temperature of the film forming component such as the resin fine particles to be melted on the transfer body, come into contact with and fused to a recording medium having a low temperature to increase an adhesion, thereby satisfactorily performing the transfer.

In the present invention, as the minimum filming temperature (also referred to as MFT) of the second image, a minimum filming temperature of ink or a mixture of the ink and the reaction liquid is used. Specifically, when a component, such as a film forming assistant, affecting a value of the minimum filming temperature is contained in the reaction liquid, the minimum filming temperature of the mixture of the ink with the reaction liquid as an object to be measured is measured, and the obtained result is regarded as the minimum filming temperature of the second image. In addition, when a component, such as a film forming assistant, affecting a value of the minimum filming temperature is not contained in the reaction liquid, the minimum filming temperature of the ink with as an object to be measured is measured, and the obtained result is regarded as the minimum filming temperature of the second image. The minimum filming temperature of the ink or the mixture of the ink and the reaction liquid can be measured by each apparatus conforming to the generally known method, for example, JIS K 6828-2: 2003 or ISO 2115: 1996. For example, upon measuring the minimum filming temperature of the ink, the minimum filming temperature (MFT) was evaluated by the above-mentioned apparatus after each ink was dried at room temperature.

As a heating method, known means such as irradiation by various lamps, such as infrared rays and a warm air fan can be used. Among those, it is preferable to use an infrared heater due to high heating efficiency.

In the present embodiment, it is important that the MFT of the second image is equal to or higher than 100° C. to obtain an image having excellent fastness. Although the transfer of the second image onto the recording medium is performed at a temperature equal to or higher than the MFT, from the viewpoint of the transferability and fastness of the image, the transfer of the second image is preferably performed at a temperature higher than the MFT by 10° C. or more, and more preferably performed at a temperature higher than the MFT by 20° C. or more.

(Cooling Step)

In the present embodiment, to repeatedly form an image, remove a liquid, and perform a transfer, it is preferable to have a cooling step for cooling the transfer body after the transfer. Particularly, it is more preferable to have the cooling step for cooling the transfer body to below the boiling point of the water before the liquid removing step, and it is still more preferable to have the cooling step for cooling the transfer body to below the boiling point of the water after the transferring step and before the first image forming step. It is possible to again suppress the liquid content from evaporating from the image after the first image forming step and before the liquid removing step by cooling the transfer body and after the transferring step before the first image forming step. The cooling is controlled so that the image becomes lower than the boiling point of the water in the ink at the timing when the liquid removing step is performed. Further, it is more preferable that the image becomes lower than the boiling point of the water in the ink at the timing when the ink is applied.

Figure 5:
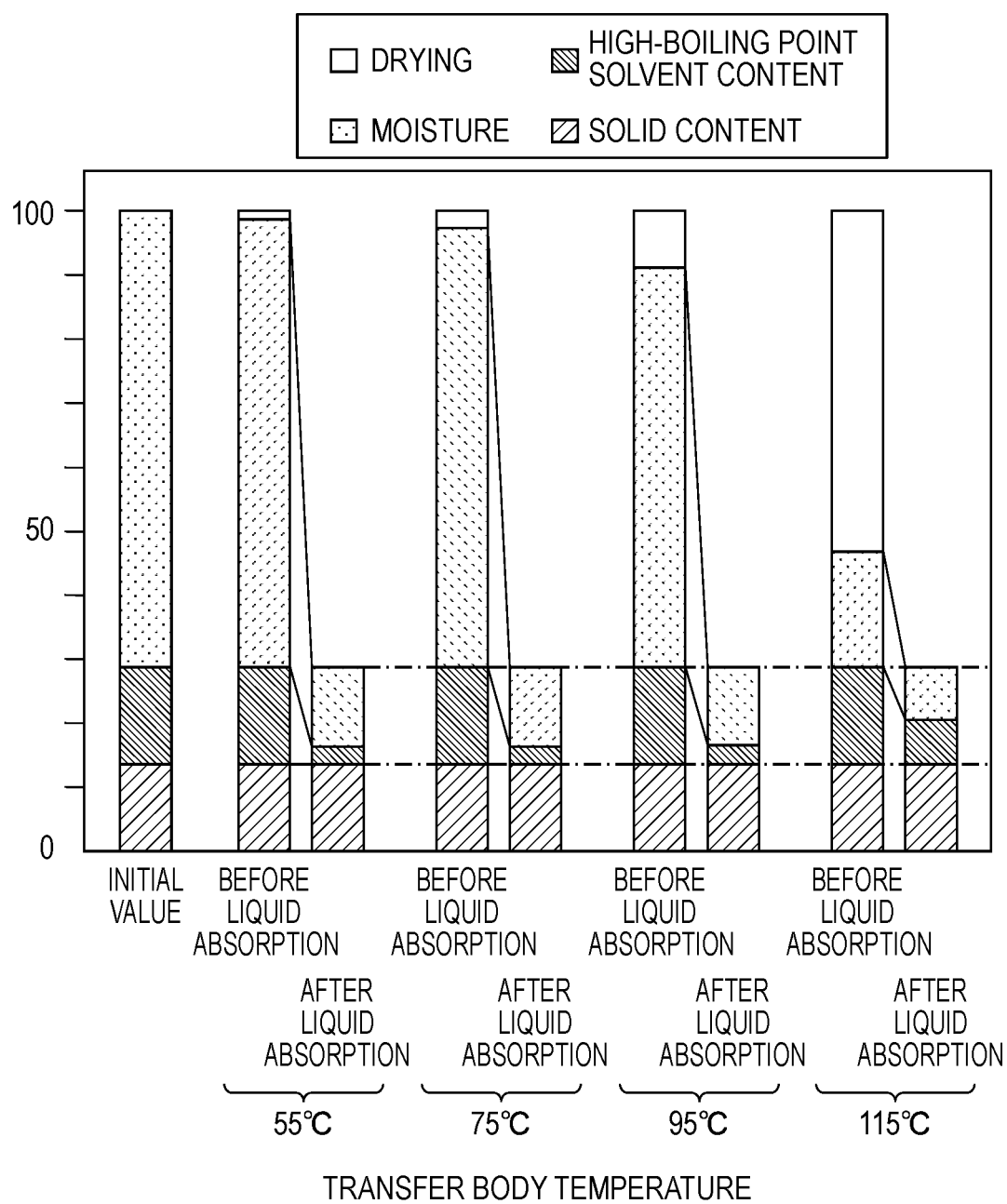
FIG. 5 is a diagram showing a change in composition in an image in drying and liquid absorption.

FIG. 5 shows an example of the temperature of the transfer body and the composition of the image before and after the liquid absorption. It is found that an image, in which as an initial value, a solid content is about 13%, a high-boiling point solvent content (water-soluble organic solvent) is about 15%, and the balance is water, is formed and then the amount of moisture to be dried differs depending on the temperature of the transfer body before the liquid removing step. In particular, a lot of moisture is dried at 100° C. or higher which is the boiling point of the water. In the liquid absorption (liquid removal) using the porous body, a certain amount of liquid remains regardless of the temperature of the transfer body. That is, in the liquid removing step, the liquid component is uniformly absorbed, and the composition ratio of the liquid component after the liquid absorption is determined depending on the evaporation before the liquid absorption. The moisture also evaporates during the transferring step, but a solvent having a boiling point higher than that of water remains in the transfer image without evaporating. As the liquid component remains in the transfer image, the fastness of the image deteriorates.

On the other hand, the transferability of the image depends on the transfer temperature. In the ink jet recording method using the aqueous ink, since there is no need to perform a transfer at a high temperature in ink having a low MFT, and a liquid cannot be sufficiently removed by the drying in some cases, it is advantageous to perform a transfer at a high temperature by using ink having a high MFT. Even if a transfer is performed at a high temperature, the fastness of the image itself becomes lower in the ink having the low MFT than in the ink having the high WT. In this way, in the present invention, both of the transferability and fastness of the image are implemented to form the excellent image.

As the ink jet recording apparatus to which the present invention is applied, there may be an ink jet recording apparatus for forming an image on a transfer body and transferring the formed image onto the recording medium.

Hereinafter, the ink jet recording apparatus will be described. In the present invention, the ink jet recording apparatus which forms an image on a transfer body and transfers the formed image onto a recording medium is hereinafter referred to as a transfer type ink jet recording apparatus for convenience.

(Transfer Type Ink Jet Recording Apparatus)

In a transfer type ink jet recording apparatus, an ink receiving medium is a transfer body for temporarily holding a first image and a second image absorbing a first liquid from the first image. In addition, the transfer type ink jet recording apparatus includes a transfer unit which includes a pressing member for transferring which transfers the second image onto a recording medium on which an image is to be formed.

Figure 2:
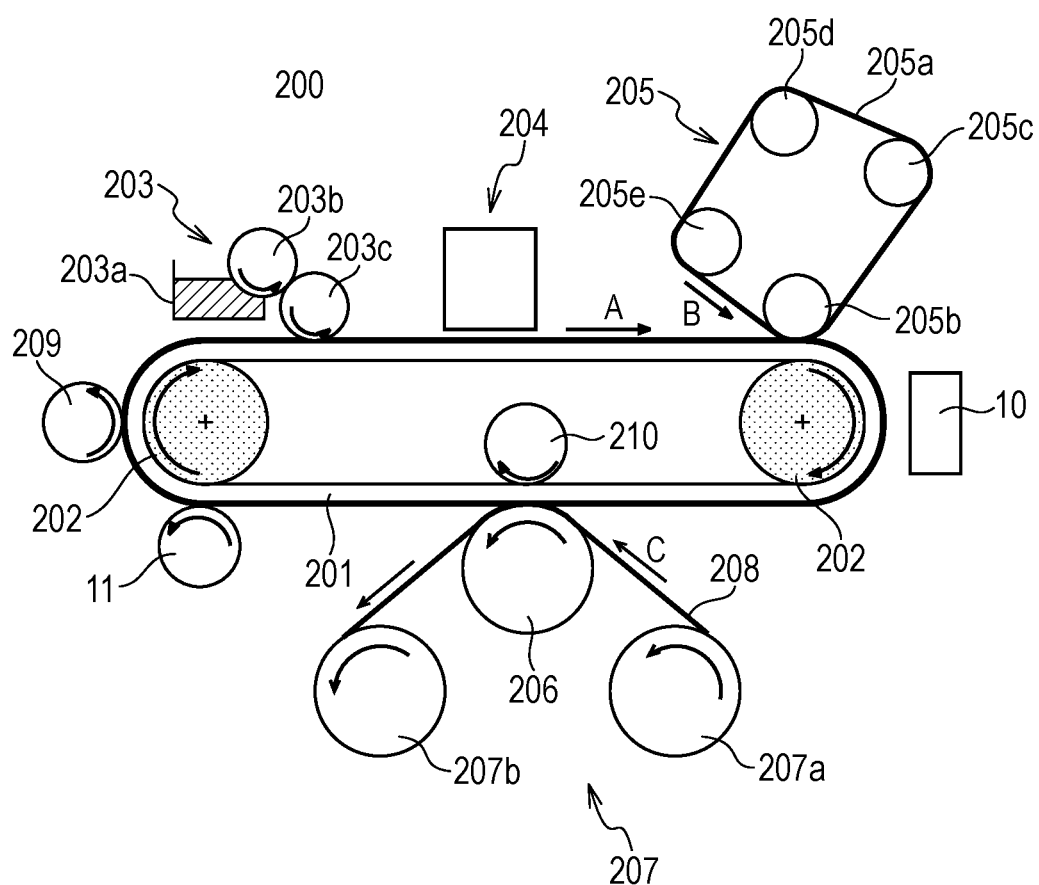
FIG. 2 is a schematic diagram showing another example of the configuration of the transfer type ink jet recording apparatus according to the present invention.

FIGS. 1 and 2 are schematic diagrams showing an example of a schematic configuration of a transfer type ink jet recording apparatus according to the present embodiment.

As shown in FIG. 1, a transfer type ink jet recording apparatus 100 of the present embodiment includes a transfer body 101 which is supported by a support member 102, a reaction liquid applying device 103 which applies a reaction liquid onto the transfer body 101, an ink applying device 104 which applies ink onto the transfer body 101 to which the reaction liquid is applied to form an ink image (first image) on the transfer body, a liquid absorbing device 105 which absorbs a liquid component from the first image on the transfer body, and a pressing member 106 for transferring which transfers a second image on the transfer body, from which the liquid component is removed by pressing a recording medium, onto a recording medium 108 such as paper. In addition, the transfer type ink jet recording apparatus 100 may have a cleaning member 109 for transfer body which cleans a surface of the transfer body 101 after the second image is transferred onto the recording medium 108.

FIG. 2 shows a transfer type ink jet recording apparatus 200 that is changed to a belt-shaped transfer body 201. The reaction liquid applying device 203, the ink applying device 204, the liquid absorbing device 205 which absorbs the liquid component contained in the first image, the pressing member 206 for transferring, and the conveyance device 207 for the recording medium 208 have the same configurations as those shown in FIG. 1, and therefore the description thereof is omitted.

Since the belt-shaped transfer body 201 has a smaller heat capacity than the drum-shaped transfer body 101 to easily perform an up and down control of temperature, the belt-shaped transfer body 201 is preferable. Reference numeral 210 denotes a counter roller which presses the transfer body 201 against the pressing member 206 for transferring. The counter roller 210 can also serve as the heating member 10. A transfer position is not limited to a position shown in FIG. 2, and transferring may be performed by use of the support member 202 facing the heating member 10 as the counter roller. Other components are almost the same as those shown in FIG. 1, and therefore will be described below with reference to FIG. 1.

The support member 102 rotates in a direction of arrow A in FIG. 1 about a rotating shaft 102a. The transfer body 101 moves by the rotation of the support member 102. The reaction liquid by the reaction liquid applying device 103 and the ink by the ink applying device 104 are sequentially applied onto the moving transfer body 101, so the first image is formed on the transfer body 101. The first image formed on the transfer body 101 moves to a position, where the first image comes into contact with the liquid absorbing member 105a of the liquid absorbing device 105, by the movement of the transfer body 101.

The liquid absorbing member 105a of the liquid absorbing device 105 moves in synchronization with the rotation of the transfer body 101. The image formed on the transfer body 101 is in the contact state with the moving liquid absorbing member 105a. In the meantime, the liquid absorbing member 105a removes the liquid component from the image. Since the first image is in the contact state with the liquid absorbing member 105a, the liquid component contained in the first image is removed, but it is preferable to press the liquid absorbing member 105a against the first image with a predetermined pressing force in the contact state to effectively function the liquid absorbing member 105a.

The removal of the liquid component can be expressed from a different point of view as concentrating the ink constituting the image formed on the transfer body. The concentration of the ink means that the content ratio of solid contents such as coloring material and resin contained in the ink with respect to the liquid component increases as the liquid component contained in the ink decreases.

Then, the second image after the liquid component is removed moves to a heating unit by the movement of the transfer body 101, and is heated by the heating member 10. The heated second image moves to a transfer unit in contact with the recording medium which is conveyed by a conveyance device 107 for recording medium. The ink image is formed on the recording medium 108 by allowing the pressing member 106 to press the recording medium while the second image after being heated is in contact with the recording medium 108. The ink image after the transfer which is transferred onto the recording medium 108 is a reverse image of the second image. In the following description, apart from the above-described first image (ink image before the removal of liquid) and the second image (ink image after the removal of liquid), the ink image after the transfer is referred to as a third image.

Since the reaction liquid is applied onto the transfer body and then the ink is applied to form an image, the reaction liquid remains in a non-image region (non-ink image forming region) without reacting with the ink. In the present apparatus, the liquid absorbing member 105a contacts (pressure contacts) not only the image but also the unreacted reaction liquid to remove even the liquid component of the reaction liquid from the surface of the transfer body 101.

However, the removal of the liquid component from the image is expressed and described above, which is not limited to the removal of the liquid component from the image alone but means that at least the liquid component is removed from the image on the transferred body. For example, it is possible to remove the liquid component in the reaction liquid which is applied to the first image and an outer region of the first image. It should be noted that the liquid component is not particularly limited as long as it does not have a certain shape, has fluidity, and has substantially a constant volume. For example, the water, the organic solvents or the like which is contained in the ink or the reaction liquid can be regarded as the liquid component.

In addition, even when the above-mentioned clear ink in the first image, it is possible to concentrate the ink by the liquid absorbing treatment. For example, if the clear ink is applied onto a color ink containing a coloring material applied onto the transfer body 101, the clear ink exists over the entire surface of the first image, or the clear ink partially exists on one location or a plurality of locations of the surface of the first image and the color ink exists on other locations thereof. In the first image, at the locations where the clear ink exists on the color ink, the porous body absorbs the liquid component of the clear ink on the surface of the first image, and the liquid component of the clear ink moves. As a result, the liquid component in the color ink moves toward the porous body, so the aqueous liquid component in the color ink is absorbed.

On the other hand, at the locations where the clear ink and the color ink exist on the surface of the first image, the liquid components of the color ink and the clear ink, respectively, move to the porous body, so the aqueous liquid component is absorbed. It should be noted that a large amount of components for improving the transferability of the image from the transfer body 101 to the recording medium may be included in the clear ink. For example, it is preferable to increase the content rate of the component that increases the stickiness to the recording medium by heating as compared with the color ink.

Each component of the transfer type ink jet recording apparatus of the present embodiment will be described below.

<Transfer Body>

As the transfer body 101, one having the elastic layer between the surface layer and the compressible layer is used as described above, and the transfer body 101 in FIG. 1 is one having a drum shape supported by the following support member 102.

<Support Member>

The transfer body 101 is supported on the support member 102. As a method for supporting a transfer body, various adhesives or double-sided tapes may be used. Alternatively, a mounting member formed of metal, ceramic, resin or the like is attached to the transfer body, so the transfer body may be supported on the support member 102 by the mounting member.

The support member 102 needs to have a certain level of structural strength from the viewpoint of conveyance accuracy and durability of the support member 102. As the material of the support member, metal, ceramic, resin and the like are preferably used. Among those, in particular, to improve control responsiveness by reducing an inertia during the operation in addition to improving rigidity or dimensional accuracy which can withstand the pressing during the transfer, in particular, aluminum, iron, stainless steel, acetal resin, epoxy resin, polyimide, polyethylene, polyethylene terephthalate, nylon, polyurethane, silica ceramics, alumina ceramics and the like are preferably used. In addition, the combinations thereof are preferably used.

<Reaction Liquid Applying Device>

The ink jet recording apparatus of the present embodiment has the reaction liquid applying device 103 which applies the reaction liquid to the transfer body 101. A case of a gravure offset roller in which the reaction liquid applying device 103 shown in FIG. 1 includes a reaction liquid container 103a which contains the reaction liquid, and reaction liquid applying members 103b and 103c which apply the reaction liquid in the reaction liquid container 103a onto the transfer body 101 is shown.

<Ink Applying Device>

The ink jet recording apparatus of the present embodiment has the ink applying device 104 which applies ink onto the transfer body 101 to which the reaction liquid is applied. The first image is formed by mixing the reaction liquid with the ink, and then the liquid component is absorbed from the first image by the liquid absorbing device 105.

<Liquid Absorbing Device>

In the present embodiment, the liquid absorbing device 105 has a liquid absorbing member 105a and a pressing member 105b for liquid absorption which presses the liquid absorbing member 105a toward the first image on the transfer body 101. It should be noted that the shapes of the liquid absorbing member 105a and the pressing member 105b are not particularly limited. For example, as shown in FIG. 1, the pressing member 105b has a columnar shape, the liquid absorbing member 105a has a belt shape, and the columnar pressing member 105b may be configured to press the belt-shaped liquid absorbing member 105a against the transfer body 101. In addition, the pressing member 105b has a columnar shape, the liquid absorbing member 105a has a cylindrical shape formed on a circumferential surface of a columnar pressing member 105b, and the columnar pressing member 105b may also be configured to press the cylindrical liquid absorbing member 105a against the transfer body.

In the present embodiment, it is preferable that the liquid absorbing member 105a has a belt shape in consideration of a space or the like in the ink jet recording apparatus. Further, the liquid absorbing device 105 having the belt-shaped liquid absorbing member 105a may have an extending member which extends the liquid absorbing member 105a. In FIG. 1, reference numerals 105c, 105d and 105e denote extending rollers as the extending members. In FIG. 1, the pressing member 105b is a roller member which rotates like the extending roller, but is not limited thereto.

In the liquid absorbing device 105, the pressing member 105b presses the liquid absorbing member 105a having the porous body against the first image, so that the liquid content contained in the first image is absorbed by the liquid absorbing member 105a, thereby obtaining the second image in which the liquid component is reduced from the first image.

Hereinafter, various conditions and configurations in the liquid absorbing device 105 will be described in detail.

(Pre-Treatment)

In the present embodiment, it is preferable to perform pre-treatment by a pre-treatment member (not shown in FIGS. 1 and 2), which applies a wetting liquid to the liquid absorbing member, before the liquid absorbing member 105a having the porous body comes into contact with the first image. The wetting liquid used for the present embodiment preferably contains water and a water-soluble organic solvent. The water is preferably water deionized by ion exchange or the like. In addition, the kind of water-soluble organic solvents is not particularly limited, and any known organic solvent such as ethanol and isopropyl alcohol can be used. In the pre-treatment of the liquid absorbing member used for the present embodiment, a method for applying a wetting liquid to a porous body is not particularly limited, but immersion or liquid droplet dripping is preferable.

(Pressing Condition)

It is preferable that the pressure of the liquid absorbing member which presses against the first image on the transfer body is equal to or more than 2.9 N/cm$^2$ (0.3 kgf/cm$^2$), because the liquid component in the first image can be separated into solid-liquid in a shorter period of time and the liquid component can be removed from the first image. The pressure of the liquid absorbing member in this specification indicates a nip pressure between the transfer body and the liquid absorbing member, and a surface pressure distribution measuring device (I-SCAN manufactured by Nitta Co., Ltd.) performs a surface pressure measurement and divides weighting in a pressed region by an area to calculate a value.

(Application Time)

It is preferable that the application time of bringing the liquid absorbing member 105a into contact with the first image is within 50 ms (millisecond) in order to further suppress the adhesion of the coloring material in the first image to the liquid absorbing member. It should be noted that the application time in this specification is calculated by dividing a pressure sensing width in the moving direction of the transfer body by the moving speed of the transfer body, in the above described surface pressure measurement. Hereinafter, the application time is referred to a liquid absorbing nip time.

In this way, the second image, in which the liquid content is absorbed from the first image and the liquid content is reduced, is formed on the transfer body 101. The second image is then heated by the heating member 10, and is transferred onto the recording medium 108 in the transfer unit.

The device configuration and condition at the time of the transfer will be described.

<Heating Member>

An infrared heater is used as the heating member 10 in the present embodiment, and the surface temperature of the second image is measured by a non-contact type temperature measuring device (not shown), and the heater is turned on/off so that the surface temperature reaches a predetermined temperature. In FIGS. 1 and 2, although the heating member 10 is provided outside the transfer body, the heating member may have the form in which it is included inside the pressing member for transferring to be described later, and may heat the transfer body at the same time as the transfer.

<Pressing Member for Transferring>

In the present embodiment, the pressing member 106 for transferring presses the recording medium 108 while the heated second image comes into contact with the recording medium 108 conveyed by the conveyance device 107 for recording medium, thereby transferring the ink image onto the recording medium 108. The liquid component contained in the first image on the transfer body 101 is removed and then is transferred onto the recording medium 108, thereby obtaining the recording image in which curling, cockling or the like is suppressed.

The pressing member 106 obtains a certain degree of structural strength from the viewpoint of the conveyance accuracy and durability of the recording medium 108. As the material of the pressing member 106, metal, ceramic, resin and the like are preferably used. Among those, to improve control responsiveness by reducing an inertia during the operation in addition to improving rigidity or dimensional accuracy which can withstand the pressing during the transfer, in particular, aluminum, iron, stainless steel, acetal resin, epoxy resin, polyimide, polyethylene, polyethylene terephthalate, nylon, polyurethane, silica ceramics, alumina ceramics and the like are preferably used. The combinations of these may also be used.

Although the pressing time of the pressing member 106 for transferring the second image on the transfer body 101 onto the recording medium 108 is not particularly limited, it is preferably 5 ms or more to 100 ms or less in order that the transfer is performed satisfactorily and the durability of the transfer body is not damaged. The pressing time in the present embodiment indicates the time during which the recording medium 108 and the transfer body 101 are in contact with each other, the surface pressure was measured by the surface pressure distribution measuring device (I-SCAN manufactured by Nitta Co., Ltd.), and the length in the conveyance direction of the pressed region was divided by the conveyance speed to calculate the value.

In addition, although there is no particular limitation as to the pressure of the pressing member 106 for transferring the second image on the transfer body 101 onto the recording medium 108, the pressure is set so that the transfer is performed satisfactorily and the durability of the transfer body is damaged. For this reason, it is preferable that the pressure is equal to or more than 9.8 N/cm$^2$ (1 kg/cm') and is equal to or less than 294.2 N/cm$^2$ (30 kg/cm$^2$). In the present embodiment, the pressure indicates a nip pressure between the recording medium 108 and the transfer body 101, and the surface pressure distribution measuring device performs the surface pressure measurement and divides the weighting in the pressed region by the area to calculate the value.

Although there is no particular limitation as to the temperature upon the pressing of the pressing member 106 for transferring the second image on the transfer body 101 onto the recording medium 108, it is preferable that the temperature is a glass transition point or more or a softening point or more of the resin component contained in the ink. In addition, for the heating, the form including the heating member 10 which heats the second image on the transfer body 101 and the heating member which heats the transfer body 101 and the recording medium 108 is preferable. The shape of the pressing member 106 is not particularly limited, but may have, for example, a roller shape.

<Recording Medium and Conveyance Device for Recording Medium>

In the present embodiment, the recording medium 108 is not particularly limited and any known recording medium can be used. Examples of the recording medium 108 may include a long object wound in a roll form or a sheet cut in a predetermined dimension. Examples of the material include paper, plastic film, wood board, corrugated cardboard, metal film or the like. In addition, in FIG. 1, the conveyance device 107 for recording medium which conveys the recording medium 108 is configured to include a recording medium feeding roller 107a and a recording medium winding roller 107b, but is not particularly limited to this configuration as long as it can convey the recording medium.

<Cooling of Transfer Body>

In the present embodiment, in order to repeatedly form an image, absorb a liquid and perform a transfer, it is preferable to have the cooling member 11 for cooling the transfer body 101 after the transfer. It is possible to again suppress the liquid content from evaporating from the image after the first image forming step and before the liquid removing step by cooling the transfer body by the cooling member after the transferring step and before the first image forming step. The cooling is controlled so that the image becomes lower than the boiling point of the water in the ink at the timing when the liquid removing step is performed. Further, it is more preferable that the image becomes lower than the boiling point of the water in the ink at the timing when the ink is applied. In addition, in FIG. 1, although the cooling step is provided after the transferring step, it may be provided after the ink applying step. In addition, although not shown, it is also preferable to provide the cooling step plural times.

In addition, the cooling is preferably controlled so that the temperature of the transfer body becomes below the clouding point of the surfactant contained in the reaction liquid. In the reaction liquid applying step, since the temperature of the transfer body is lower than the clouding point, it is estimated that the active performance of the surfactant contained in the reaction liquid is maintained, the wettability of the reaction liquid becomes sufficiently high, and the aggregation power of the image is further improved. It is considered that the transferability is improved by increasing the agglomeration power of the image. In the present invention, the clouding point of the surfactant can be measured by heating a 1% by mass aqueous solution of the surfactant.

As the cooling method, it is possible to use a known method such as a method for blowing cold air, a method for contacting a cooled roller, a method for applying a cooled liquid and a method for using heat of vaporization. In particular, it is preferable to use a method for bringing a solid or a liquid into contact with a transfer body for high-speed cooling. The solid and liquid are cooled to a temperature lower than the boiling point of the water. In addition, it is also preferable to combine blowing and the like. As a method for contacting a liquid, the liquid may be directly applied or may be contacted by being contained in the porous body. In addition, it is possible to more certainly suppress the evaporation of the liquid component in the first image and to prevent the absorption failure even in the liquid removing step, by cooling the liquid absorbing member 105a.

<Cleaning Member>

In the present embodiment, it is also possible to use the cleaning member 109 for cleaning the image remaining on the transfer body after the transfer, paper dust transferred from the recording medium or the like. The cleaning can appropriately use the known method such as a method for contacting a porous member, a method for rubbing with a brush, a method for scraping with a blade or the like. In addition, as the shape of the member, the known shape such as a roller shape and a web shape can also be used. In the present invention, it is preferable that the temperature of the cleaning member is lowered by the cooling, and thus the cleaning member also serves as the above-mentioned cooling member.

<Control System>

Figure 3:
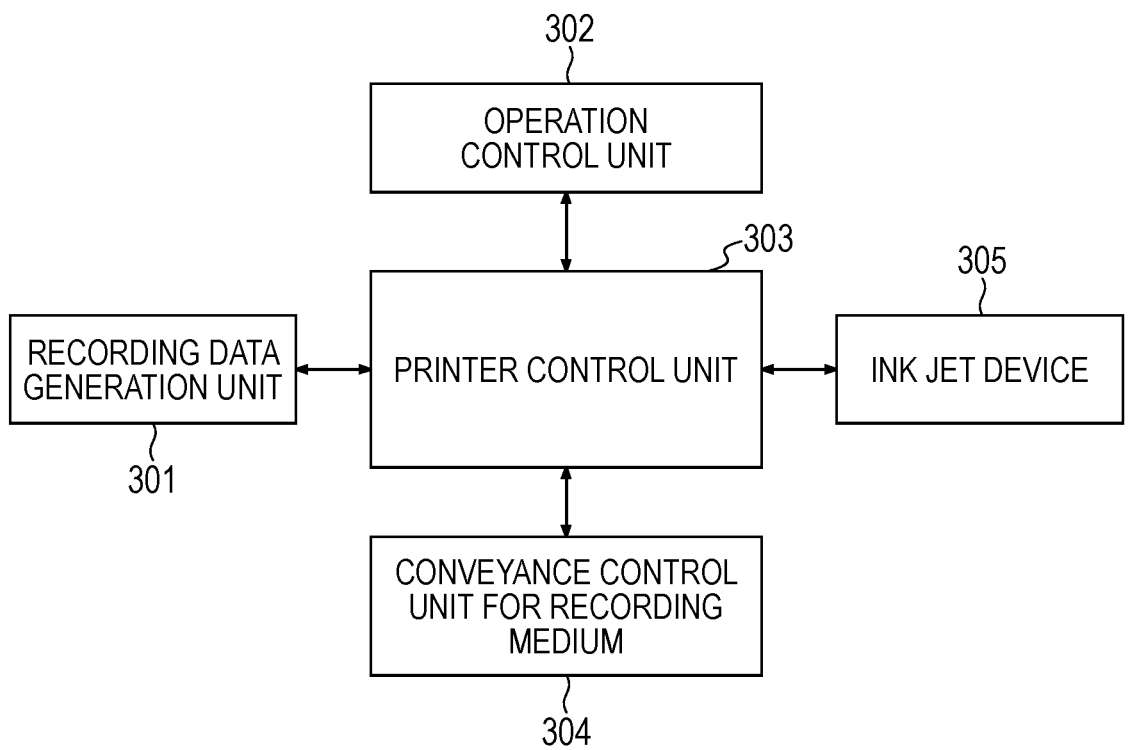
FIG. 3 is a block diagram of a control system of the entire apparatus in the ink jet recording apparatus shown in FIG. 1.

In the present embodiment, the transfer type ink jet recording apparatus includes a control system which controls each apparatus. FIG. 3 is a block diagram of a control system of the entire apparatus in the transfer type ink jet recording apparatus shown in FIG. 1.

In FIG. 3, reference numeral 301 denotes a recording data generation unit such as an external print server, reference numeral 302 denotes an operation control unit such as an operation panel, reference numeral 303 denotes a printer control unit which executes a recording process, reference numeral 304 denotes a conveyance control unit for recording medium which conveys a recording medium, and reference numeral 305 denotes an ink jet device for printing.

Figure 4:
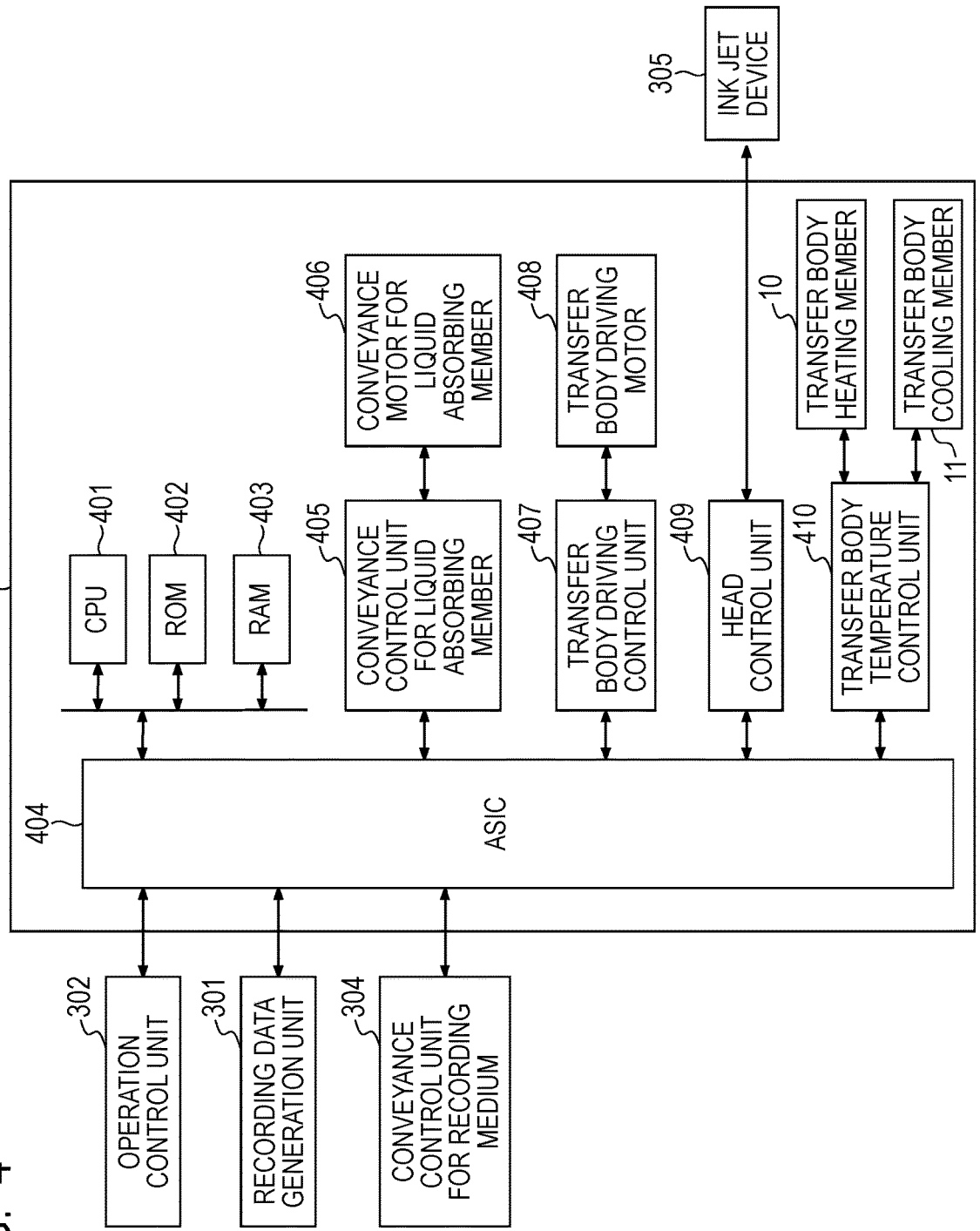
FIG. 4 is a block diagram of a printer control section in the transfer type ink jet recording apparatus shown in FIG. 1.

FIG. 4 is a block diagram of the printer control unit in the transfer type ink jet recording apparatus of FIG. 1. Reference numeral 401 denotes a CPU which controls the entire printer, reference numeral 402 denotes an ROM which stores a control program of the CPU and reference numeral 403 denotes an RAM which executes a program. Reference numeral 404 denotes an ASIC in which a network controller, a serial IF controller, a controller for generating head data, a motor controller and the like are embedded. Reference numeral 405 denotes a conveyance control unit for liquid absorbing member which drives a conveyance motor 406 for a liquid absorbing member, and is controlled with commands from the ASIC 404 via the serial IF. Reference numeral 407 is a transfer body driving control unit which drives a transfer body driving motor 408, and is similarly controlled with command from the ASIC 404 via the serial IF. Reference numeral 409 denotes a head control unit, and generates final discharge data of the ink jet device 305, generates a driving voltage or the like. In addition, reference numeral 410 is a transfer body temperature control unit, and controls the temperature of the heating member 10 and the cooling member 11.

[Example]

Hereinafter, the present invention will be described in more detail with reference to Examples and Comparative Examples. The present invention is not limited to the following Examples as long as it does not deviate from the gist of the invention. In the description of the following Examples, "unit" is on a mass basis unless otherwise specified.

In the present example, the transfer type ink jet recording apparatus shown in FIG. 1 was used.

In the present example, the transfer body 101 is fixed to the support member 102 by the adhesive. In the present example, a sheet in which a PET sheet having a thickness of 0.5 mm was coated with silicone rubber (KE12 manufactured by Shin-Etsu Chemical Co., Ltd.) with a thickness of 0.3 mm was used as an elastic layer of a transfer body J. Further, glycidoxypropyltriethoxysilane and methyltriethoxysilane were mixed at a molar ratio of 1:1, and a mixture of a condensate obtained by heating reflux and a photocationic polymerization initiator (SP150 manufactured by ADEKA) was prepared. Atmospheric pressure plasma treatment was performed so that a contact angle of water on a surface of the elastic layer was equal to or less than 10°, the mixture was applied onto the elastic layer, and a film was formed by UV irradiation (high-pressure mercury lamp, integrated exposure amount of 5000 mJ/cm$^2$) and thermosetting (150° C. for 2 hours) to prepare the transfer body 101 having a surface layer of 0.5 μm in thickness formed on the elastic body. In this configuration, although not shown for the sake of simplicity of explanation, a double-sided tape was used to hold the transfer body 101 between the transfer body 101 and the support member 102.

The reaction liquid applied by the reaction liquid applying device 103 was formed of the following composition, and the application amount was 1 g/m$^2$. The clouding point of the surfactant in the following reaction liquid was 50° C. It should be noted that the clouding point of the surfactant was measured by heating a 1% by mass aqueous solution of the surfactant.

| | |
|---|---|
| Glutaric acid | 21.0 parts |
| Potassium hydroxide | 2.0 parts |
| Glycerin | 5.0 parts |
| Surfactant (product name: TF-2066, manufactured by DIC Corporation) | 5.0 parts |
| Ion exchange water | balance |

The ink was prepared as follows.

<Preparation of Pigment Dispersion>

10 parts of carbon black (product name: Monarch 1100, manufactured by Cabot Corporation), 15 parts of a resin aqueous solution 1 (an aqueous solution having a styrene-ethyl acrylate-acrylic acid copolymer with an acid value of 150, a weight average molecular weight (Mw) of 8,000 and a resin content of 20.0% by mass was neutralized with an aqueous solution of potassium hydroxide) and 75 parts of pure water were mixed, charged into a batch type vertical sand mill (manufactured by Aimex), filled with 200 parts of zirconia bead having a diameter of 0.3 mm, and subjected to the dispersion treatment for 5 hours while being cooled with water. After the coarse particles were removed by centrifuging this dispersing liquid, a black pigment dispersion having a pigment content of 10.0% by mass was obtained.

<Preparation of Resin Fine Particle Dispersion>

(Preparation of Resin Fine Particle Dispersion 1)

Mixed were 18% of ethyl methacrylate, 2% of 2,2'-azobis-(2-methylbutyronitrile) and 2% of n-hexadecane, and stirred for 0.5 hours. The mixture was dropped into a 6% aqueous solution (combination ratio 78%) of "NIKKOL BC15" (trade name, manufactured by Nikko Chemicals Co., Ltd.) which is an emulsifier and stirred for 0.5 hours. Next, ultrasonic waves were applied for 3 hours by an ultrasonic irradiator. Next, polymerization was performed at 80° C. for 4 hours under the nitrogen atmosphere and filtration was performed after cooling at room temperature to prepare a resin fine particle dispersion 1 having a resin content of 25.0% by mass.

<Preparation of Ink 1>

The resin fine particle dispersion 1 and the pigment dispersion obtained above were mixed with each of the following components to prepare ink 1. The ion exchange water balance was set to be an amount which makes the total of all the components constituting the ink 100.0% by mass.

| Pigment dispersion (a content of coloring material is 10.0% by mass) | 40.0% by mass |
|---|---|
| Resin fine particle dispersion 1 | 20.0% by mass |
| Glycerin | 7.0% by mass |
| Polyethylene glycol (weight average molecular weight (Mn): 1,000) | 3.0% by mass |
| Surfactant (trade name: Acetylenol E100, manufactured by Kawaken Fine Chemicals Co., Ltd.) | 0.5% by mass |
| Ion exchange water | balance |

After the mixture was sufficiently stirred and dispersed, it was subjected to the pressure filtration by a micro filter (manufactured by Fujifilm Corporation) having a pore size of 3.0 μm to prepare the ink 1. The minimum filming temperature (MFT) of the ink 1 was 100° C. The measurement of the minimum film formation temperature (MFT) was performed by using the sample after drying the ink at room temperature for 24 hours and evaluating the film formation temperature.

<Preparation of Ink 2>

Ten parts of polyethylene wax (trade name "High Wax 100P", manufactured by Mitsui Chemicals, Inc.), 125 parts of resin aqueous solution 1 and 65 parts of ion exchange water to obtain a mixture.

The obtained mixture was passed three times through a high pressure homogenizer (trade name "Nanovater", manufactured by Yoshida Kikai Kogyo Co., Ltd.) heated at 120° C. with a heating option to obtain a wax particle dispersion 1. The volume average dispersed particle diameter of the wax measured using a dynamic light scattering particle diameter distribution measuring device (trade name "Microtrack UPAEX-150", manufactured by Nikkiso Co., Ltd.) was 120 nm.

Similarly to the ink 1, the following ink 2 was prepared using the wax particle dispersion 1.

(Ink 2)

| Pigment dispersion (a content of coloring material is 10.0% by mass) | 40.0% by mass |
|---|---|
| Resin fine particle dispersion 1 | 15.0% by mass |
| Wax particle dispersion 1 | 5.0% by mass |
| Glycerin | 7.0% by mass |
| Polyethylene glycol (weight average molecular weight (Mn): 1,000) | 3.0% by mass |
| Surfactant (trade name: Acetylenol E100, manufactured by Kawaken Fine Chemicals Co., Ltd.) | 0.5% by mass |
| Ion exchange water | balance |

The minimum filming temperature (MFT) of the ink 2 was 110° C.

<Preparation of Ink 3>

(Preparation of Resin Fine Particle Dispersion 2)

Mixed were 18% of butylmethacrylate, 2% of 2,2'-azobis-(2-methylbutyronitrile) and 2% of n-hexadecane, and stirred for 0.5 hours. The mixture was dropped into a 6% aqueous solution (combination ratio 78%) of "NIKKOL BC15" (trade name, manufactured by Nikko Chemicals Co., Ltd.) which is an emulsifier and stirred for 0.5 hours. Next, ultrasonic waves were applied for 3 hours by an ultrasonic irradiator. Next, polymerization was performed at 80° C. for 4 hours under the nitrogen atmosphere and filtration was performed after cooling at room temperature to prepare the resin fine particle dispersion 2 having a resin content of 25.0% by mass.

The resin fine particle dispersion 2 and the pigment dispersion obtained above were mixed with each of the following components to prepare ink 3. The ion exchange water balance was set to be an amount which makes the total of all the components constituting the ink 100.0% by mass.

| Pigment dispersion (a content of coloring material is 10.0% by mass) | 40.0% by mass |
|---|---|
| Resin fine particle dispersion 2 | 20.0% by mass |
| Glycerin | 7.0% by mass |
| Polyethylene glycol (weight average molecular weight (Mn): 1,000) | 3.0% by mass |
| Surfactant (trade name: Acetylenol E100, manufactured by Kawaken Fine Chemicals Co., Ltd.) | 0.5% by mass |
| Ion exchange water | balance |

After the mixture was sufficiently stirred and dispersed, it was subjected to the pressure filtration by a micro filter (manufactured by Fujifilm Corporation) having a pore size of 3.0 μm to prepare the ink 3. The minimum filming temperature (MFT) of the ink 3 was 50° C.

The ink applying device 104 used the ink jet head of the type which discharges ink by an on-demand method using an electrothermal transducer element, and the ink applying amount was set to be 20 g/m$^2$. The liquid absorbing member 105a was controlled to be equal to the moving speed of the transfer body 101 by the conveyance rollers 105c, 105d and 105e which convey the liquid absorbing member while extending the liquid absorbing member. In addition, to achieve the same speed as the moving speed of the transfer body 101, the recording medium 108 is conveyed by the recording medium feeding roller 107a and the recording medium winding roller 107b. In the present example, the conveyance speed was set to be 0.1 m/s, and Aurora coated paper (manufactured by Nippon Paper Industries Co., Ltd., basis weight of 104 g/m$^2$) was used as the recording medium 108. The image on the transfer body was transferred onto the recording medium by a pressure of 29.4 N/cm$^2$ (3 kg/cm$^2$).

In addition, the pressure is applied to the liquid absorbing member 105b so that the average pressure of the nip pressure between the transfer body 101 and the liquid absorbing member 105a is 29.4 N/cm$^2$ (3 kg/cm$^2$). In addition, as the pressing member 105a in the liquid absorbing device 105, a roller having a diameter φ of 400 mm was used. As the liquid absorbing member 105a, a hydrophilic PTFE having an average pore diameter of 0.2 μm was used. The absorbing member had Gurley of 8 seconds.

Further, as the heating member 10, the infrared heater manufactured by Heraeus Co., Ltd. was used. The heating temperature of the image was controlled by changing the input voltage to the infrared heater. Further, a method for bring a nonwoven fabric (HOP 60 manufactured by Hirose Paper Mfg. Co., Ltd.) containing water cooled by a chiller not shown as the cooling member 11 into contact with a transfer body was used. The cooling temperature of the transfer body was controlled by controlling the cooling temperature of the contained water. The transferability and absorption performance of the image were evaluated under the conditions shown in the following Table 1 by combining the control states of the inks 1 to 3, the heating member and the cooling member. Unlike the above Example 1, in Example 4, the liquid absorbing member was controlled to be cooled to below 70° C. In addition, in the following Table 1, "the boiling point of the ink main solvent" means "the boiling point of the water in the ink" and "the minimum filming temperature of the image" means "the minimum filming temperature of the second image". Further, "printing to liquid removal temperature" means "the temperature of the first image after the first image forming step (ink applying step) and before the liquid removing step". In the present example, since the components influencing the minimum filming temperature of the second image, such as a film forming assistant, are not contained in the reaction liquid, the minimum filming temperature of the ink was set to be the minimum filming temperature of the second image.

TABLE 1

|  | Ink | Clouding point of surfactant in reaction liquid (° C.) | Boiling point of main solvent of ink (° C.) | Minimum filming temperature of image (° C.) | Reaction liquid coating temperature (° C.) | Printing to liquid removing temperature (° C.) | Heating temperature of image by heating member (° C.) |
|---|---|---|---|---|---|---|---|
| Example 1 | Ink 1 | 50 | 100 | 100 | 80 | 70 | 120 |
| Example 2 | Ink 2 | 50 | 100 | 110 | 80 | 70 | 120 |
| Example 3 | Ink 1 | 50 | 100 | 100 | 45 | 40 | 120 |
| Example 4 | Ink 1 | 50 | 100 | 100 | 80 | 70 | 120 |
| Comparative Example 1 | Ink 1 | 50 | 100 | 100 | 120 | 120 | 120 |
| Comparative Example 2 | Ink 1 | 50 | 100 | 100 | 40 | 40 | 40 |
| Comparative Example 3 | Ink 3 | 50 | 100 | 50 | 80 | 70 | 120 |

The evaluation results evaluated under the conditions shown in the above Table 1 are shown in Table 2. In the present invention, the evaluation criteria A to B of each of the following evaluation items were regarded as acceptable levels and C was regarded as an unacceptable level.

<Transferability>

The transfer amount by the transferring step under the above conditions is shown. It is preferable that the transfer amount is large (the region not transferred is small) and the evaluation standard is as follows.

A: The image region, which is not to be transferred, was not substantially observed.
B: The image region, which is not to be transferred, is slightly observed, which was a level with no problem in practical use.
C: The large image region, which is not to be transferred, was observed, which was a problem in practical use.

<Fastness>

The liquid removability on the transfer body and the fastness of the image depending on the MFT of the image are shown. If the residual amount of liquid is large, the fastness of the image may be lowered. Therefore, it is preferable that the residual amount of liquid is small. In addition, the fastness of the image is also affected by the MFT of the image. The evaluation criteria are as follows. The image on the recording medium produced under the above conditions is cut into a strip shape of 25 mm in width, and an abrasion resistance tester (manufactured by Imoto Seisakusho Co., Ltd.) as a Gakushin-type testing machine was used to perform a friction test on the same printing paper, which are disposed on a printed product cut into the strip shape and a scratcher, 200 times with a load of 500 g to evaluate scratch resistance.

In addition, the evaluation result of the transferability is C, which means that the evaluation is impossible, so it is marked as no evaluation (–).

A: No scratch is observed.
B: Scratch was slightly observed, which was a level with no problem in practical use.
C: A great deal of scratch was observed.

TABLE 2

|  | Transferability | Fastness |
|---|---|---|
| Example 1 | B | B |
| Example 2 | A | B |
| Example 3 | A | A |
| Example 4 | B | A |

TABLE 2-continued

|  | Transferability | Fastness |
|---|---|---|
| Comparative Example 1 | B | C |
| Comparative Example 2 | C | — |
| Comparative Example 3 | B | C |

According to the ink jet recording method for bringing a porous body into contact with an image to absorb and transfer a liquid, it is possible to form the high-quality image with the fastness and transferability of the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ink jet recording method repeatedly performing the following steps on a transfer body, the ink jet recording method comprising:
    a step of forming a first image including a liquid component containing water and a water-soluble organic solvent having a boiling point higher than that of the water and an insoluble solid content contained in the liquid component formed by mixing a reaction liquid with ink by a step of applying the reaction liquid containing an ink viscosity-increasing component and a step of applying the ink containing the water and a coloring material onto the transfer body;
    a liquid removing step of forming a second image from the first image by bringing a porous body into contact with the transfer body on which the first image is formed to remove a part of the liquid component contained in the first image;
    a transferring step of transferring the second image onto a recording medium by heating the second image to a temperature equal to or higher than a minimum filming temperature of the second image and separating the recording medium from the transfer body; and a cooling step of cooling the transfer body after the transferring step and before repeating the step of applying the reaction liquid, wherein the minimum filming temperature of the second image is a temperature equal to or higher than 100° C., and wherein the first image is not subjected to a heat history equal to or higher than a boiling point of the water after the step of forming the first image and before the liquid removing step.

2. The ink jet recording method of claim 1, wherein a content of the water-soluble organic solvent in the first image is at least 3% by mass, and wherein a water content in the first image is greater than a water content in the water-soluble organic solvent.

3. The ink jet recording method of claim 1, wherein the transfer body is cooled to below the boiling point of the water, before the liquid removing step.

4. The ink jet recording method of claim 3, wherein the reaction liquid contains a surfactant.

5. The ink jet recording method of claim 1, wherein the cooling step is performed of cooling the transfer body to below the boiling point of the water after the transferring step and before repeating the step of forming the first image.

6. The ink jet recording method of claim 1, wherein in the cooling step, a solid or a liquid comes into contact with the transfer body.

7. The ink jet recording method of claim 1, wherein the ink includes a wax particle.

8. The ink jet recording method of claim 1, wherein the porous body is cooled to a temperature lower than that of the first image.

9. The ink jet recording method of claim 1, further comprising a cleaning step of cleaning the transfer body after the transferring step, and the cleaning step and the cooling step are performed at the same time.

10. The ink jet recording method of claim 1, wherein a maximum temperature of the first image after the step of forming the first image and before the liquid removing step is lower than the boiling point of the water by 30° C. or more.

11. The ink jet recording method of claim 1, wherein a content of the water-soluble organic solvent in the second image immediately after the second image is formed is equal to or less than 0.9 g/m².

12. The ink jet recording method of claim 1, wherein the transfer body includes a drum-shaped transfer body.

13. The ink jet recording method of claim 1, wherein the transfer body includes a belt-shaped transfer body.

14. An ink jet recording method repeatedly performing the following steps on a transfer body, the ink jet recording method comprising:

a step of forming a first image including a liquid component containing water and a water-soluble organic solvent having a boiling point higher than that of the water and an insoluble solid content contained in the liquid component formed by mixing a reaction liquid with ink by a step of applying the reaction liquid containing an ink viscosity-increasing component and a step of applying the ink containing the water and a coloring material onto the transfer body;

a liquid removing step of forming a second image by concentrating the ink constituting the first image by bringing a porous body into contact with the transfer body on which the first image is formed;

a transferring step of transferring the second image onto a recording medium by heating the second image to a temperature equal to or higher than a minimum filming temperature of the second image and separating the recording medium from the transfer body; and a cooling step of cooling the transfer body after the transferring step and before repeating the step of applying the reaction liquid, wherein the minimum filming temperature of the second image is a temperature equal to or higher than 100° C., and wherein the first image is not subjected to a heat history equal to or higher than a boiling point of the water after the step of forming the first image and before the liquid removing step.

* * * * *